(12) United States Patent
Klausner et al.

(10) Patent No.: US 11,244,274 B2
(45) Date of Patent: Feb. 8, 2022

(54) INDUCTION UNIT AND LABEL GENERATOR

(71) Applicant: United States Postal Service, Washington, DC (US)

(72) Inventors: Peter Klausner, Washington, DC (US); Robert E. Dixon, Jr., Haymarket, VA (US)

(73) Assignee: United States Postal Service, Washington, DC (US)

( * ) Notice: Subject to any disclaimer, the term of this patent is extended or adjusted under 35 U.S.C. 154(b) by 885 days.

(21) Appl. No.: 15/967,141

(22) Filed: Apr. 30, 2018

(65) Prior Publication Data

US 2019/0005741 A1    Jan. 3, 2019

Related U.S. Application Data

(60) Provisional application No. 62/492,633, filed on May 1, 2017, provisional application No. 62/536,073, filed on Jul. 24, 2017.

(51) Int. Cl.
| | |
|---|---|
| *G06Q 10/08* | (2012.01) |
| *G06Q 50/28* | (2012.01) |
| *G07F 17/42* | (2006.01) |
| *G07B 17/00* | (2006.01) |

(52) U.S. Cl.
CPC ........... *G06Q 10/083* (2013.01); *G06Q 50/28* (2013.01); *G07B 17/00016* (2013.01); *G07B 17/00314* (2013.01); *G07B 17/00508* (2013.01); *G07F 17/42* (2013.01); *G07B 2017/00064* (2013.01); *G07B 2017/00161* (2013.01); *G07B 2017/00258* (2013.01); *G07B 2017/00588* (2013.01)

(58) Field of Classification Search
CPC ............ G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| | | | |
|---|---|---|---|
| 2002/0152174 A1* | 10/2002 | Woods .................. | G06Q 10/08 705/60 |
| 2002/0156645 A1 | 10/2002 | Hansen | |

(Continued)

FOREIGN PATENT DOCUMENTS

| | | |
|---|---|---|
| EP | 2913804 A1 | 9/2015 |
| WO | WO 2013/191787 A2 | 12/2013 |
| WO | WO 2015/173820 A1 | 11/2015 |

OTHER PUBLICATIONS

Self Service Mail Technologies, USPsoig.gov, available at: https://www.uspsoig.gov/blog/self-service-mail-technologies?page=1, last accessed Sep. 17, 2021 (Year: 2008).*

(Continued)

*Primary Examiner* — Emmett K. Walsh
(74) *Attorney, Agent, or Firm* — Knobbe Martens Olson & Bear LLP

(57) ABSTRACT

Systems described herein for controlling, requesting, and coordinating the creation and generation of labels can be a label broker, providing a centralized location for storing label information created by various entities, and managing the requests for generation of physical labels coming from various sources and entities.

18 Claims, 23 Drawing Sheets

(56) References Cited

U.S. PATENT DOCUMENTS

| | | | |
|---|---|---|---|
| 2003/0144971 A1* | 7/2003 | Das | G06Q 20/20 |
| | | | 705/401 |
| 2004/0089482 A1 | 5/2004 | Ramsden et al. | |
| 2004/0186811 A1* | 9/2004 | Gullo | G06Q 10/083 |
| | | | 705/402 |
| 2006/0080133 A1 | 4/2006 | Das et al. | |
| 2006/0138220 A1 | 6/2006 | Persky | |
| 2009/0076650 A1 | 3/2009 | Faes | |
| 2009/0177739 A1 | 7/2009 | Uslontsev et al. | |
| 2011/0161249 A1 | 6/2011 | Whitehouse | |
| 2012/0267057 A1 | 10/2012 | Rydberg | |
| 2012/0303527 A1 | 11/2012 | Karlisch et al. | |
| 2013/0338822 A1 | 12/2013 | Gibson, Jr. et al. | |
| 2014/0012804 A1* | 1/2014 | Gullo | G06Q 10/0833 |
| | | | 707/609 |
| 2014/0279648 A1* | 9/2014 | Whitehouse | G06Q 10/083 |
| | | | 705/330 |
| 2015/0145642 A1 | 5/2015 | Rutledge et al. | |
| 2015/0371187 A1 | 12/2015 | Irwin et al. | |
| 2016/0350712 A1* | 12/2016 | Wesemann | G06Q 10/0833 |
| 2017/0116571 A1* | 4/2017 | Tammattabattula | A47G 29/141 |
| 2018/0315015 A1* | 11/2018 | Pientka | G06Q 10/06 |
| 2019/0212956 A1* | 7/2019 | Christman | G06F 16/22 |

OTHER PUBLICATIONS

International Search Report & Written Opinion dated Oct. 20, 2017 in International Application No. PCT/US2017/046093.

International Search Report & Written Opinion dated Aug. 9, 2018 in International Application No. PCT/US2018/030306 filed Apr. 30, 2018.

International Preliminary Report on Patentability dated Nov. 5, 2019 in International Application No. PCT/US2018/030306 filed Apr. 30, 2018.

Paul Singh, S., Gary Burgess, and Jagjit Singh. "Measurement and analysis of the second-day air small and light-weight package shipping environment within federal express." Packaging Technology and Science: An International Journal 17 .3 (2004): 119-127. (Year: 2004).

* cited by examiner

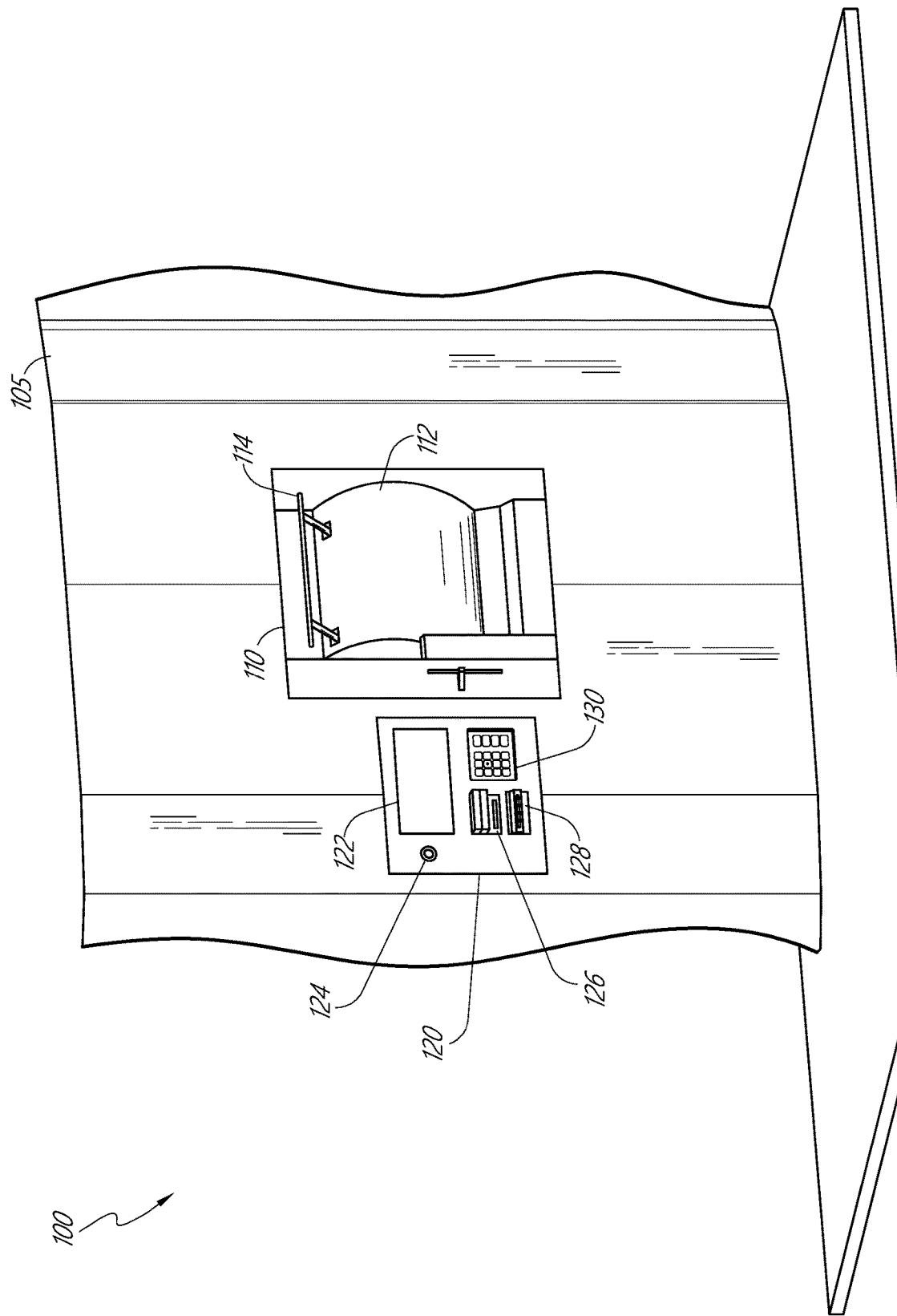

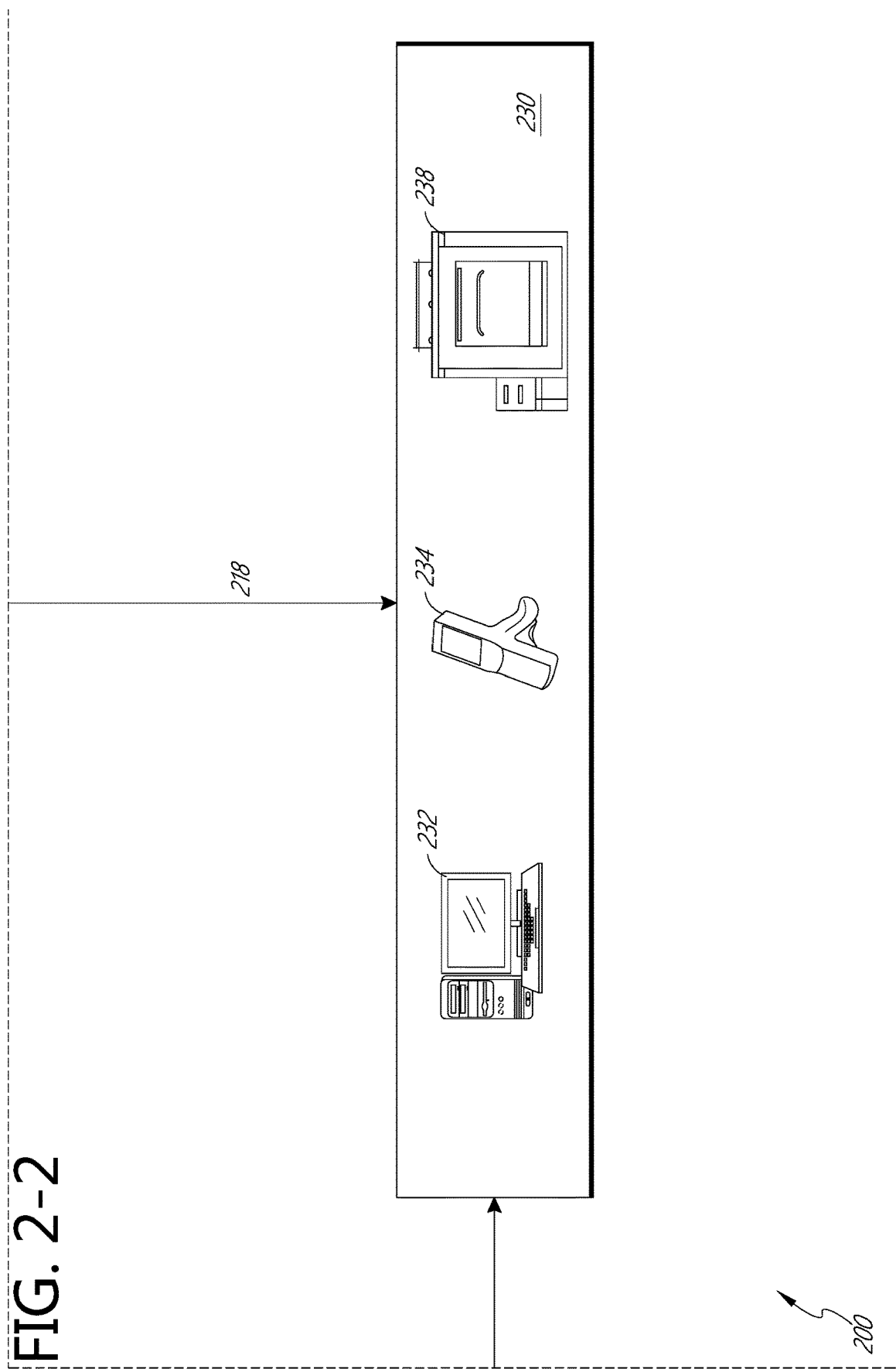

INDUCTION UNIT AND LABEL GENERATOR

CROSS-REFERENCE TO RELATED APPLICATIONS

The present application claims priority to U.S. Provisional Patent Application Ser. No. 62/492,633, filed May 1, 2017 and entitled "INDUCTION UNIT AND LABEL GENERATOR," and U.S. Provisional Patent Application Ser. No. 62/536,073, filed Jul. 24, 2017 and entitled "INDUCTION UNIT AND LABEL GENERATOR," both of which are hereby expressly incorporated by reference in its entirety. Furthermore, any and all priority claims identified in the Application Data Sheet, or any correction thereto, are hereby incorporated by reference under 37 C.F.R. § 1.57.

BACKGROUND

Field

The current disclosure relates to the field of induction of items into a distribution network and the associated labels for shipping and payment.

Description of the Related Art

Item distribution generally requires an indication on an item of the destination and indicia of payment for distribution of the item. Some individuals or entities wishing to ship items may not have the means for generating a label having computer-readable indicia thereon. Systems and methods described herein relate to item deposit receptacles and label creation and generation.

SUMMARY

The systems, methods, and devices of the disclosure each have several innovative aspects, no single one of which is solely responsible for the desirable attributes disclosed herein. In one innovative aspect a system for labeled induction of an item into a distribution network. The system includes: a label provider configured to receive, from a sender communication device, a request for a label to distribute an item via a distribution network. The label provider is further configured create a label based on the request for the label and transmit, to a distribution server, the created label for the item. The system also includes the distribution server which is in communication with the label provider. The distribution server is configured to receive, from the label provider, the created label. The distribution server is configured to receive generate a machine-readable identifier for the label. The distribution server is also configured to receive store, in a data storage device, the created label and an association between the created label and the machine-readable identifier. The distribution server is configured to receive, from an induction communication device, the machine-readable identifier for the label. The distribution server is further configured to receive retrieve the created label from the data storage device based at least in part on the machine-readable identifier. The distribution server is configured to receive cause, via the induction communication device, generation of a physical label based at least in part on the created label retrieved from the data storage device, where the generation of the physical label is deferred for a period of time subsequent to the generation of the machine-readable identifier. Other embodiments of this aspect include corresponding computer systems, apparatus, and computer programs recorded on one or more computer storage devices, each configured to perform the actions of the methods.

Implementations may include one or more of the following features. The distribution server may be further configured to: receive, via the induction communication device, a confirmation that the physical label has been created; and store, in the data storage device, an indicator in association with the machine-readable identifier, where the indicator indicates that the physical label has been created. The distribution server may be further configured to: receive, from another communication device, the machine-readable identifier for the label; determine, based on the indicator and the machine-readable identifier, that the physical label has been created; and transmit a message to the another communication device indicating that the physical label has been created. In some implementations of the system, the label may include a sender address identifying a location from which the item is being distributed. The distribution server may be further configured to: receive, from the induction communication device, location information for the induction communication device; determine that the location information for the induction communication device is within a threshold distance of the sender address, where the physical label is generated in response to determining that the location information is within the threshold distance of the sender address.

Additionally or alternatively, the distribution server may be configured to: receive, from a scanning device, scanned information from the physical label; confirm that the scanned information corresponds to the item; and route the item to an item processing equipment for a distribution network based at least in part on the scanned information. The physical label may include an identifier indicating that the physical label was generated by the distribution server based on a request from the label provider. The item processing equipment may include a postage canceler, and where the distribution server is configured to route the item to bypass the postage canceler in response to receiving the confirmation.

The system may include an induction receptacle for storing an item, where the induction receptacle includes: a locking means for securing the induction receptacle; and a scanning device for detecting information from the physical label. The distribution server may be further configured to: receive, from the scanning device, scanned information from the physical label; retrieve a disposition status for the item from the data storage device based at least in part on the scanned information, where the disposition status indicates whether the item has been inducted into the distribution network; determine that the item has not been inducted to the distribution network based at least in part on the disposition status; and transmit a message to the locking means, where the message causes the locking means to permit access to the induction receptacle.

Some embodiments of the system may include a labeling kiosk. The labeling kiosk may include an input interface for receiving machine readable identifiers for labels, where receiving the machine-readable identifier includes receiving the machine-readable identifier from the labeling kiosk. The induction communication device may include the labeling kiosk. The input interface may include at least one of: (a) a scanning device; or (b) a graphical user interface. The created label may include a data file containing information for generating the physical label. For example, the created label may include an image of the label. In some implementations, receiving the machine-readable identifier may include receiving the machine readable identifier from a portable, handheld scanning device associated with a distribution resource of the distribution network. The distribution server may be further configured to transmit, to the sender communication device, the machine-readable identifier for the label. Additionally or alternatively, the distribution server may be further configured to transmit, to the label provider, the machine-readable identifier for the label. The innovative features described may include or be implemented by hardware, a method or process, or computer software on a computer-accessible medium.

In another innovative aspect a system for labeled induction of an item into a distribution network is provided. The system includes one or more processing devices; and a computer-readable storage medium storing machine readable instructions that, when executed by the one or more processing devices, cause the system to receive, from a label provider, information for creating a label for distributing an item via a distribution network. The instructions also cause the system to create a label using the information for creating the label. The instructions also cause the system to generate a machine-readable identifier for the label. The instructions also cause the system to store, in a data storage device, the created label and an association between the created label and the machine-readable identifier. The instructions further cause the system to transmit, to a first communication device, the machine-readable identifier for the label. The instructions also cause the system to receive, from a second communication device, the machine-readable identifier for the label. The instructions also cause the system to retrieve the created label from the data storage device based at least in part on the machine-readable identifier. The instructions also cause the system to cause, via the second communication device, generation of a physical label based at least in part on the created label. Other embodiments of this aspect include corresponding computer systems, apparatus, and computer programs recorded on one or more computer storage devices, each configured to perform the actions of the methods.

Implementations may include one or more of the following features. The machine-readable instructions, when executed by the one or more processing devices, may further cause the system to at least: receive, via the second communication device, a confirmation that the physical label has been generated; and store, in the data storage device, an indicator in association with the machine-readable identifier, where the indicator indicates that the physical label has been generated. The machine-readable instructions, when executed by the one or more processing devices, may further cause the system to at least: receive, from another communication device, the machine-readable identifier for the label; retrieve, from the data storage device, a disposition status for the item associated with the label based at least in part on the machine-readable identifier; determine that the disposition status corresponds to an unauthorized status indicating that the label is no longer authorized for inducting the item to the distribution network; and transmit a message to the another communication device indicating that the label is unauthorized.

The machine-readable instructions, when executed by the one or more processing devices, may, in some embodiments, further cause the system to at least: receive a sender address identifying a location from which the item is being distributed, receive, from the second communication device, location information for the second communication device; and determine that the location information for the second communication device is within a threshold distance of the sender address, where the physical label is generated in response to determining that the location information is within the threshold distance of the sender address. In one embodiment of the system, the physical label includes an identifier indicating that the physical label was generated based on a request from the label provider, and where the distribution network includes a postage canceler, and where the machine-readable instructions, when executed by the one or more processing devices, further cause the system to at least route the item to bypass the postage canceler based at least in part on a disposition status for the item.

Some implementations of the system include an induction receptacle for storing an item, where the induction receptacle includes: a locking means for securing the induction receptacle; and a scanning device for detecting information from the physical label. The machine-readable instructions, when executed by the one or more processing devices, may further cause the system to at least: receive, from the scanning device, scanned information from the physical label; retrieve a disposition status for the item from the data storage device based at least in part on the scanned information, where the disposition status indicates whether the item has been inducted into the distribution network; determine that the item has not been inducted to the distribution network based at least in part on the disposition status; and transmit a message to the locking means, where the message causes the locking means to permit access to the induction receptacle. In one embodiment, the induction receptacle may include measurement means configured to collect measurement information a physical characteristic of the item.

The information for creating the label may include a specified value for the physical characteristic (e.g., weight, size, packaging). The machine-readable instructions, when executed by the one or more processing devices, may further cause the system to at least: store, in the data storage device, the specified value in association with the machine-readable identifier; retrieve, from the data storage device, the specified value for the label based at least in part on the machine-readable identifier; and determine that the measurement information corresponds to the specified value for the physical characteristic, where the message is transmitted after determining that the measurement information corresponds to the specified value. The innovative features described may include or be implemented by hardware, a method or process, or computer software on a computer-accessible medium.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 2-1 depicts a first section of a system for operating and using an item receptacle and for label creation and generation with connections to FIGS. 2-2 and 2-3, according to the arrangement of FIG. 2.

FIG. 2-2 depicts a second section for operating and using an item receptacle and for label creation and generation with connections to FIGS. 2-1 and 2-3, according to the arrangement of FIG. 2.

FIG. 2-3 depicts a third section for operating and using an item receptacle and for label creation and generation with connections to FIGS. 2-1 and 2-2, according to the arrangement of FIG. 2.

FIG. 3 is a block diagram of an item receptacle system.

FIG. 8-1 depicts a first section of an exemplary process flow diagram showing data flows between entities, and shows connections to FIG. 8-2 according to the arrangement of FIG. 8.

FIG. 8-2 depicts a first section of an exemplary process flow diagram showing data flows between entities, and shows connections to FIG. 8-1 and FIG. 8-3 according to the arrangement of FIG. 8.

FIG. 8-3 depicts a first section of an exemplary process flow diagram showing data flows between entities, and shows connections to FIG. 8-2 according to the arrangement of FIG. 8.

FIG. 9-1 depicts a first section of an exemplary process flow diagram showing data flows between entities for label generation, and shows connections to FIGS. 9-2 and 9-3 according to the arrangement of FIG. 9.

FIG. 9-2 depicts a first section of an exemplary process flow diagram showing data flows between entities for label generation, and shows connections to FIG. 9-1 according to the arrangement of FIG. 9.

FIG. 9-3 depicts a first section of an exemplary process flow diagram showing data flows between entities for label generation, and shows connections to FIGS. 9-1 and 9-4 according to the arrangement of FIG. 9.

FIG. 9-4 depicts a first section of an exemplary process flow diagram showing data flows between entities for label generation, and shows connections to FIG. 9-3 according to the arrangement of FIG. 9.

FIG. 9-5 depicts a first section of an exemplary process flow diagram showing data flows between entities for label generation, and shows connections to FIGS. 9-3 and 9-6 according to the arrangement of FIG. 9.

FIG. 9-6 depicts a first section of an exemplary process flow diagram showing data flows between entities for label generation, and shows connections to FIG. 9-5 according to the arrangement of FIG. 9.

DETAILED DESCRIPTION

Figure 2:
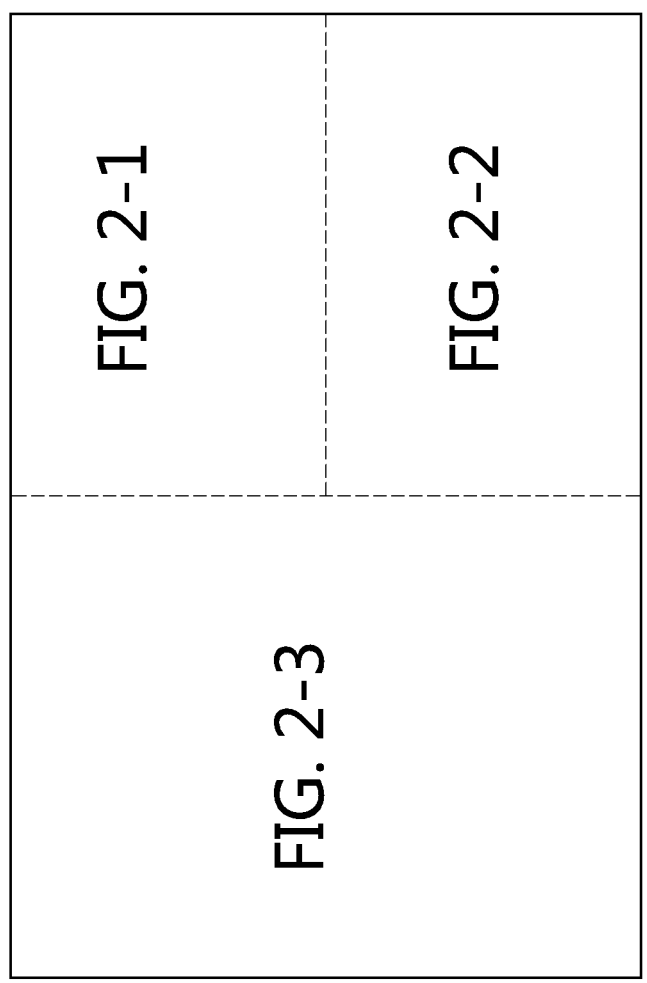
FIG. 2 is a block diagram of a system for operating and using an item receptacle and for label creation and generation showing an arrangement of drawing sections 2-1, 2-2, and 2-3.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used herein, an item can be a parcel, a package, an envelope, a flat, a mailpiece, a box, a suitcase, or any other item that can be transported from one location to another by a distribution entity. A distribution entity may be an entity engaged in transporting items from one location to another, such as the United States Postal Service (USPS), another commercial carrier, a storage facility, a fulfillment warehouse, a luggage sorting facility, or any other similar facility, company, or entity.

Using the USPS as an example, an item, such as a parcel, mailpiece, or the like has a label thereon, or information printed directly on the item (also referred to as a label herein), which indicates, among other things, a sender, a delivery point (destination), a class of service, postage, and a tracking code. The labels include computer-readable codes which encode the above items of information. The information contained in the computer-readable code must be regulated and formatted uniformly in order to be read, understood, and processed within the USPS's distribution networks. Entities including the USPS and other entities can create labels which include postage and other information, for distribution within the USPS. As used herein, creating a label can refer to the process for producing or making an electronic label, such as an electronic image of a label, a data file including label information, and the like. The USPS and other entities can be enabled to generate labels, that is, can print physical embodiments of the created labels and attach the labels to the items. As used herein, generating a label can refer to the process of producing, making, or printing a physical embodiment of a label. Generating the label can include obtaining electronic information from the created label in order to produce the physical label, as will be described herein. Some generating entities are involved with processing the label and postage, but do not have access to the physical item to be shipped. Additionally, some entities, such as individuals or businesses may wish to print their own labels, rather than going to the post office or other distribution facility. In such an instance, the user requests creation of a label for a particular item. The created label will include a destination and a postage indicia, and the label information can be sent to the individual or business for generation/printing and attaching to the item to be sent.

Systems described herein for controlling, requesting, and coordinating the creation and generation of labels can be a label broker, providing a centralized location for storing label information created by various entities, and managing the requests for generation of physical labels coming from various sources and entities.

Some entities, such as an individual or business wishing to send an item via a distribution network may have computer capabilities, but may not have printing capabilities or may not wish to print the label. In such an instance, the sending entity can request a shipping label be created, pay postage, and prepare the item for shipping. The entity can then go to a post office or to an item receptacle, such as an item induction unit, which has label printing capability. The entity can request creation generation of a label (e.g., printing a physical label) at an item receptacle such as at a self-serve location, without needing to go to and wait in line at a post office or other shipping facility.

Figures 1, 2:
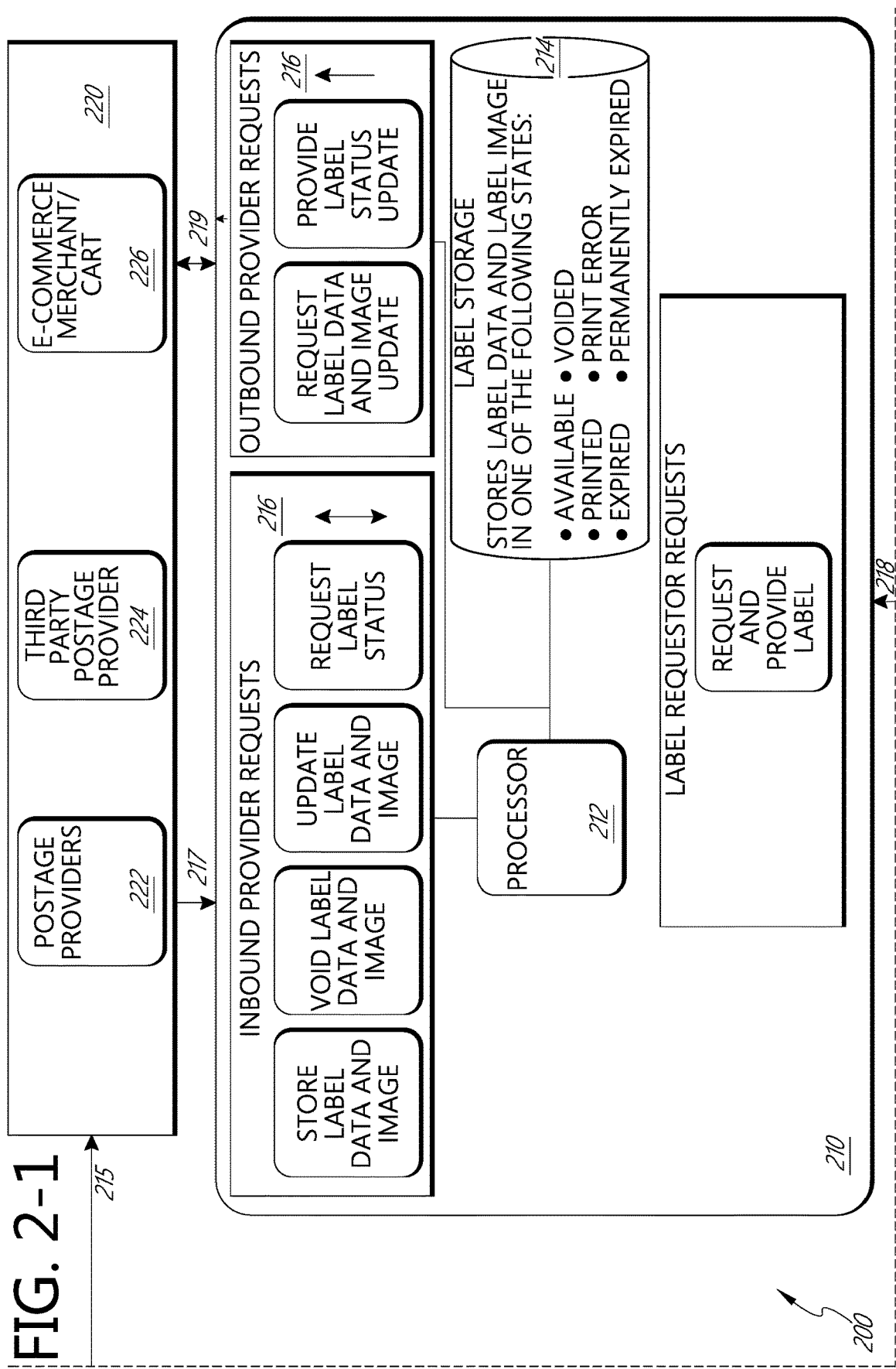
FIG. 1 is a perspective view of an embodiment of an item receptacle in an in-wall type installation.

FIG. 1 depicts an embodiment of an item receptacle 100 installed in a wall 105. The item receptacle 100 includes an item receiving portion 110 (shown in a closed position), including a rotatable drum 112 and a handle 114. The item receptacle 100 further includes a user interface 120. The user interface 120 provides an input interface to request or receive information for distributing an item. The user interface 120 includes a screen 122, a sensor 124, a payment device 126, a printer 128, and an input interface 130. The item receptacle 100 and the user interface 120, as well as their subcomponents, may be connected to and in communication with computer elements (not shown) of the item receptacle 100, such as one or more processors and/or memory circuits, which will be described in greater detail with reference to FIG. 3. The item receptacle 100 may be similar to and operate similar those described in U.S. Provisional Patent Application No. 62/374,190, entitled Smart Drop Box and filed Aug. 12, 2016, the entire contents of which are hereby incorporated by reference.

The item receiving portion 110 is configured to receive an item within the drum 112 when rotated to an open position, and can further be configured to automatically drop the item into a box, bin, or other collection container behind the wall 105 when the drum 112 is returned to a closed position. For example, in some embodiments, the wall drum 112 can be a cylinder mounted partially in the wall so as to rotate about a longitudinal axis passing through the two circular end faces of the cylinder. The drum 112 can include a cavity or opening in the side of the cylinder, configured to receive an item. In one example, the cavity can include a radial wedge-shaped portion of the cylinder. The cavity can be positioned such that the cavity is exposed to the outside when the drum 112 is in an open position. The cavity can further be configured to allow an item within the cavity to fall out of the drum 112 and into a collection container due to gravity, when the drum 112 is in a closed position. The drum 112 can be rotated from the closed position shown to an open position by moving the handle 114 downward. An intermediate position can be a rotational position between the open position and the closed position. For example, an intermediate position may be relatively close to the closed position so as to prevent a user from taking an item out of the drum 112, while also being far enough from the closed position such that gravity does not cause the item within the drum 112 to fall into the collection container.

In some embodiments, the item receiving portion 110 can be configured to open similar to a locker, have a roll-up door, or be of another desired configuration which is capable of opening, receiving an item, and closing such that, after an item is deposited in the item receiving portion 110, the item is not accessible to another user or entity. It will be understood that the item receptacle or item induction unit can have a variety of configurations without departing from the scope of the present disclosure.

The item receiving portion 110 may be configured to be operable manually, such as by a user of the item receptacle 100 rotating the drum 112 by the handle 114. In some embodiments, the item receiving portion 110 may be configured to be operated automatically by one or more motors (not shown) controlled by computer elements of the item receptacle 100. The item receptacle 100 may further include one or more locks (not shown) controlled by computer elements of the item receptacle 100 and configured to prevent the drum 112 from rotating. The one or more locks may be configured to lock the drum 112 in an open position, a closed position, and/or an intermediate position between open and closed. For example, an intermediate position may be sufficiently closed to prevent an item in the drum 112 from being removed (e.g., "trapping" the item), while being far enough from a fully closed position that the item in the drum does not drop from the drum 112 into the collection container. As will be described in greater detail with reference to FIGS. 4 and 5, an intermediate position may advantageously allow the item receptacle 100 to secure an item for verification of postage, size, and/or weight, while also allowing the item receiving portion 110 to return the item to a user if acceptance of the item is rejected by the item receptacle 100 or by the user.

The user interface 120 can be configured for various purposes related to receipt, deposit, labelling, shipping, and item distribution. For example, the user interface 120 can be a display screen having an interface 130. In some embodiments, the interface 130 can be incorporated into the user interface 120, such as a touch screen interface, or can comprise a keypad, keyboard, one or more hard keys or soft keys, and the like. The user interface 120 is configured to receive user input, providing user notification, and the like, as will be described in greater detail below. In some embodiments, the screen 122 may be only a display screen, or may be an interactive screen such as a touch screen configured to display graphic or text content and to receive tactile input from a user. A keypad can be provided as an alternative or additional input interface 130 if the screen 122 is a touch screen, or can be the primary input device if the screen 122 is not capable of receiving input. The user interface 120 may comprise or be implemented as a portable handheld scanning device to facilitate use by a delivery agent (e.g., postal carrier or other distribution resource) moving between locations.

The user interface 120 can include a near field communication, Bluetooth, or similar wireless protocol transfer capable of receiving information from a wireless computing device. The user interface 120 can connect to the mobile computing device of a user, and the user can interact with the item receptacle 100 from the user's mobile computing device, and can send information to and receive information from the user interface 120.

The sensor 124 can be a scanning device such as a camera (e.g., a still image camera, a video camera, a webcam, etc.), an optical scanner, a laser barcode scanner, or any other optical signal acquisition device or combination thereof. The sensor 124 may be configured to read payment or other information, such as a barcode or QR code on a label, printout, smartphone or tablet screen, and/or may be configured to take images for proof of deposit, such as an image of an item being deposited or of the person depositing the item. The information read by the sensor 124 may be referred to as scanned information.

The payment device 126 may be configured to accept payment. In some embodiments, the payment device 126 comprises one or more of a magnetic or chip card reader, a near field communication device, a Bluetooth device or similar wireless communication protocol for receiving electronic payment, a currency acceptor, and the like. For example, users intending to ship an item who have not prepaid for shipping services may make the necessary payment (e.g., paying for postage) at the item receptacle 100, and may provide payment at the payment device 126. In some embodiments, the payment device 126 such as magnetic card reader may further be configured to read magnetic media for purposes other than payment. For example, the magnetic card reader may be configured to read a magnetic strip on a driver's license or other identification card to verify the identity of a user.

The printer 128 can provide printed documents to a user, such as a shipping label, an acceptance verification receipt, a receipt for purchase of shipping services, a payment indicia, such as postage, or other printed media. The printer 128 can print on a label having an adhesive on one side thereon. In some embodiments, the printer 128 can spray a label or code onto an item to be deposited. In some embodiments, the printer 128 can print a label, postage, computer-readable code and the like on an item which has been deposited into the item receiving portion 110. In such embodiments, the printer 128 can comprise a moveable print head that can extend to contact a surface of the item to be deposited, or the item after deposit.

Additionally, the item receptacle can include features in addition to creation and generation of labels, including, for example, printing stamps. A user can purchase stamps via a website, or an application running on a smartphone. The application will provide a computer-readable code when payment for postage has been confirmed. The user can provide the computer-readable code to the sensor 124, where the item receptacle can confirm the computer-readable code as being a valid stamp purchase. Stamps can then be printed at the printer 128, or by separate component, such as a stamp printer (not shown).

FIG. 2 depicts a block diagram of a system 200 for operating and using an item receptacle 100 and for label creation and generation. The system 200 comprises a central hub 210. The central hub is in wired and/or wireless communication with a label provider system 220, a label request system 230, and a user interface system 225.

The central hub 210 includes a processor 212, a memory 214, and communications modules 216. The processor 212 is configured to direct the activities of the central hub 210 and to execute programs stored in the memory 214. The processor 212 processes communications to and from the label provider system 220, the label request system 230, and the receptacle 100. The memory 214 can store operating instructions for the processor 212 and label information. In some embodiments, memory 214 is a dedicated storage device for storing label information, and operating instructions can be stored elsewhere within the central hub 210. In some embodiments, the memory 214 can comprise a database or other data storage device for storing, managing, and providing label data upon request. As will be described in greater detail, the memory 214 can store the date and time of creation of a label, whether the label has expired, whether the label has been generated, the date and time of label generation, disposition status for the item associated with the label, and/or any other desired information or indicators thereof. Each transaction, such as a label creation request, a label generation request, and the like, which system 200 performs can create a database record including information taken from various components of system 200 during the processes of creation and generation of labels. This database record can be part of the label information stored in the memory 214, or it can be in addition to the label information stored in memory 214 and can be associated with the label information stored in memory 214.

The communications modules 216 include a plurality of communications pathways including inbound communications 217, requestor communications 218, and outbound communications 219. Inbound communications 217 come from the label provider system 220, and include label information, as will be described in greater detail below. Requestor communications 218 come from the label request system 230 and include requests to generate physical labels and include label information sent to label printers or other devices, as will be described in greater detail below. Outbound communications 219 are generally initiated by the central hub 210 and are sent to the label provider system 220. The outbound communications 219 include updates to label status, label cancellation or expiration, label analytic information, and the like, as will be described in greater detail below.

In some embodiments, inbound communications 217, requestor communications 218, and outbound communications 219 can be performed via one or more APIs which allow the label providers with access to the central hub 210, and via which label providers (e.g., the label provider system 220) can see the status of labels created, such as whether and when the labels have been generated, processed, inducted into the distribution network, who generated the labels, and the like. The central hub 210 may thus operate as a distribution server or label broker to coordinate the generation of physical labels and induction of items based thereon.

The label provider system 220 can include a postage provider 222, a third party provider 224, and/or an e-commerce merchant 226. The postage provider 222, the third party provider 224 and the e-commerce merchant 226 can create labels having label information thereon. These label-provider entities can create these labels in response to a label creation requests via a label request communication connection 215 coming from users, such as via an application or web site, which will be described in greater detail below. The label provider system 220 can create labels and provide created label information to the central hub 210, which can be stored in the memory 214. The postage provider 222 can be a distribution network, such as the United States Postal Service (USPS). The third party provider 224 can be an entity that contracts with a distribution network to manage payment for distribution, such as postage, or who manages postage and label creation. The e-commerce merchant 226 can be a retailer, wholesaler, or other similar merchant entity. The e-commerce merchant 226 can create labels which include label information for items sold to users, businesses, and other entities. In some embodiments, the third party provider 224 and the e-commerce merchant 226 can create labels according to a format readable and/or usable by the distribution network, for example, the USPS.

The label provider system 220 can communicate with the central hub 210 via a wired connection, a wireless connection, or a combination of both. In some embodiments, entities, for example, the postage provider 222, may be associated with the central hub 210, and may be under control of the distribution network. In some embodiments, entities, such as the third party provider 224 and the e-commerce merchant 226 may be separate or distinct entities from the distribution network and which operate under an agreement with the distribution entity. In such cases, the distribution entity can provide rules and requirements relating to the label information, access to databases and payment systems, so that created labels can be properly read and understood, and payment transacted when the item reaches the processing equipment of the distribution entity. For example, the processing equipment may include a postage canceler configured to mark postage affixed to an item as used thereby avoiding the reuse of the same postage for a different item. Since the system includes features for tracking the disposition status of an item, including whether an item has been inducted to the system using a specific physical label, the postage canceler may be bypassed. The processing equipment may be configured to route an item to a destination location such as a receptacle for items within a geographic area that includes the destination location for the item. Sorters, conveyors, drones, robots, or other automated devices may be adjusted based on the information scanned from the physical label to ensure the item is positioned for distribution.

The label request system 230 is in wired or wireless communication with the central hub 210. The label request system 230 can include different induction communication devices, each of which is in communicating connection with the central hub 210. The induction communication devices can be a computer terminal 232, such as at a retail location, a post office, website or online interface, and the like, a mobile delivery device 234, an item receptacle 238, a self-service kiosk, or another stationary or mobile computing device. The item receptacle 238 can be similar to the item receptacle 100 or other induction receptacles described elsewhere herein and can be used interchangeably. The central hub 210 may include a locator service which provides a machine interface (e.g., application programming interface) to provide discovery of item receptacles at or near a specific location which can be used for deferred generation of physical labels as described. For example, the locator server may receive a ZIP code, address, or other location identification information. The locator service may query a registry of item receptacles at or near the specified location. The query may include a default distance or receive a distance as an input parameter. The query may provide information identifying those item receptacles within the default or specified distance to the specified location. A listing of item receptacles may then be returned by the locator service. Additional information about an item receptacle may be included such as hours of operation, limitations on what can or cannot be inducted using the receptacle (e.g., letters only, item dimensions, etc.), or an operator of the location (e.g., USPS, university, postal service company, etc.).

The computer terminal 232 can be a home computer, laptop, or similar device with internet connectivity. A user can access the label provider system 220 to request creation of a label. In some embodiments, the request to generate a label can be performed in an application resident on the computer terminal 232, in the mobile delivery device 234, or in the item receptacle 238.

The mobile delivery device 234 can be a handheld or portable device used by a carrier or other resource of the distribution network. In some embodiments, the mobile delivery device 234 can be a proprietary or dedicated device having specialized software or applications for use by a carrier which facilitates requests for generation of labels. In some embodiments, the mobile delivery device 234 can be a mobile computing device, such as a smartphone running applications which allow or assist a carrier or other resource to perform their duties. The mobile delivery device 234 can also allow access to the central hub. The mobile delivery device 234 can comprise a scanner, such as a barcode scanner, an optical scanner, a camera, or other similar input device. The mobile delivery device can also comprise an input device, such as a keyboard or touchscreen. The mobile delivery device 234 can also include a printer, or can be in communication with a printer, which can generate a label based on information input into the mobile delivery device 234. In some embodiments, the printer associated with the mobile delivery device 234 can be located remote from the mobile delivery device 234, such as on a carrier's vehicle or at a distribution network facility. The process of creation and generation of labels using a delivery device 234 will be described in greater detail below.

The item receptacle 238 can be similar to those described above with regard to FIG. 1. The label request system 230 and the central hub 210 are in communication with the item receptacle 238 via a wired or wireless connection, as will be described elsewhere herein.

The user interface system 225 can comprise a computing device that can be used to request creation and/or generation of a label. These processes will be described in greater detail below. The user interface system 225 can include, for example, a computer terminal 233 or a mobile computing device, such as a smartphone 236. When associated with a sender of the item, the computing device may be referred to as a sender communication device.

In some embodiments the computer terminal 233 accesses an application or module configured to communicate with the label provider system 220, such as an application associated with the postage provider 222, the third party provider 224, or the e-commerce merchant, and requests creation of a label. In some embodiments, the request for creation of labels can be provided to the central hub 210 via the label request system 230. The request and creation of labels will be described in greater detail below. The computer terminal 233 can access the label provider system 220 via a wired or wireless network. In some embodiments, the computer terminal 233 can access the label provider system 220 via website or specialized application running on the computer terminal 233.

The smartphone 236 can be a tablet computer or cellular phone capable of RF, 3G, 4G, LTE, Bluetooth, Wi-Fi, or other similar wireless communication protocols. The smartphone 236 includes a display screen, is configured to run an application which communicates with the label provider system 220, and facilitates requesting creation of a label via the label provider system 220. The application can also allow a requestor or user to update or modify labels which have been previously generated, or which have been created and not yet generated. In some embodiments, the smartphone 236 can communicate with the central hub 210 and request label creation from the label provider system 220 via the central hub 210. The process of creating and generating a label via the smartphone 236 will be described in greater detail below.

Figures 2, 3:
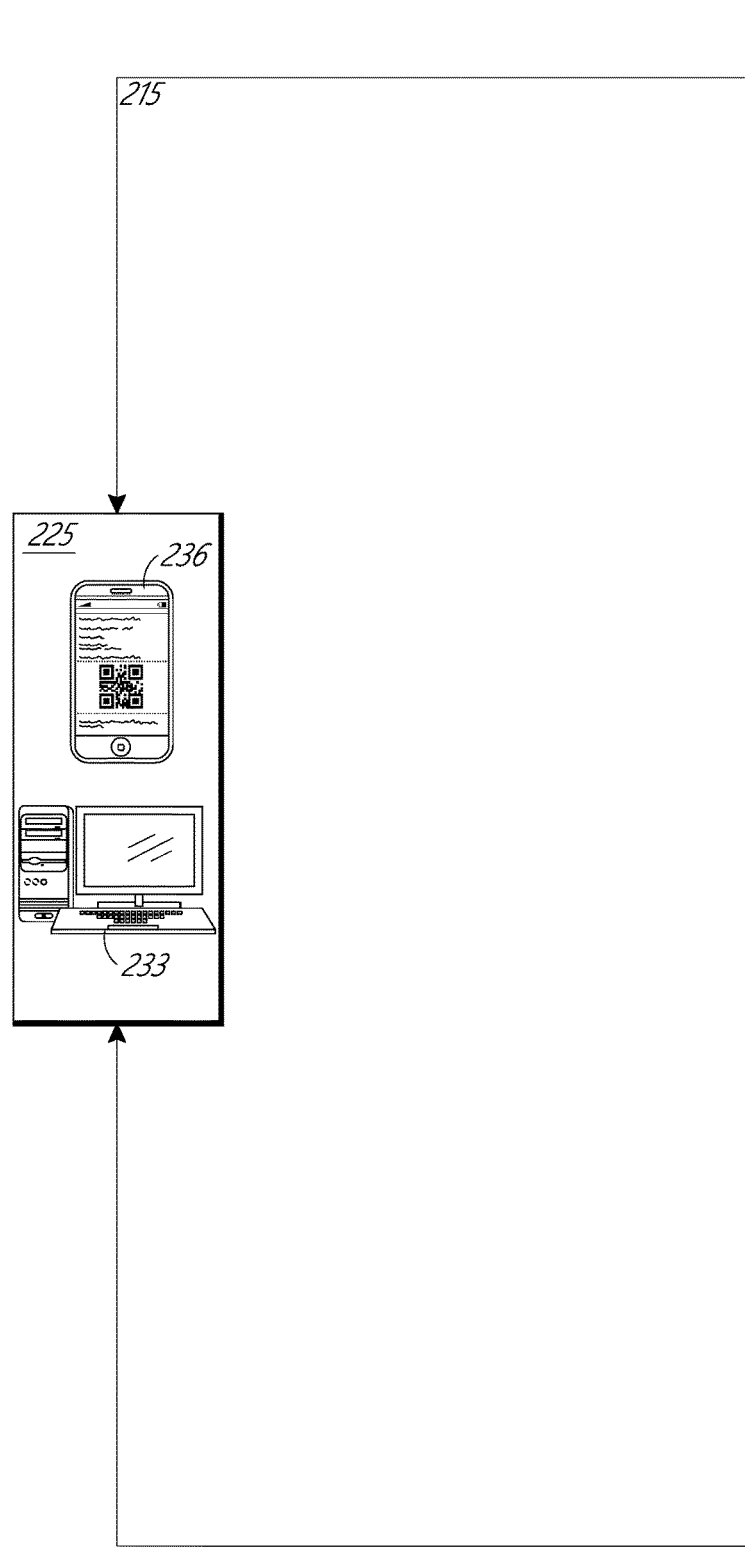
Figure 3:
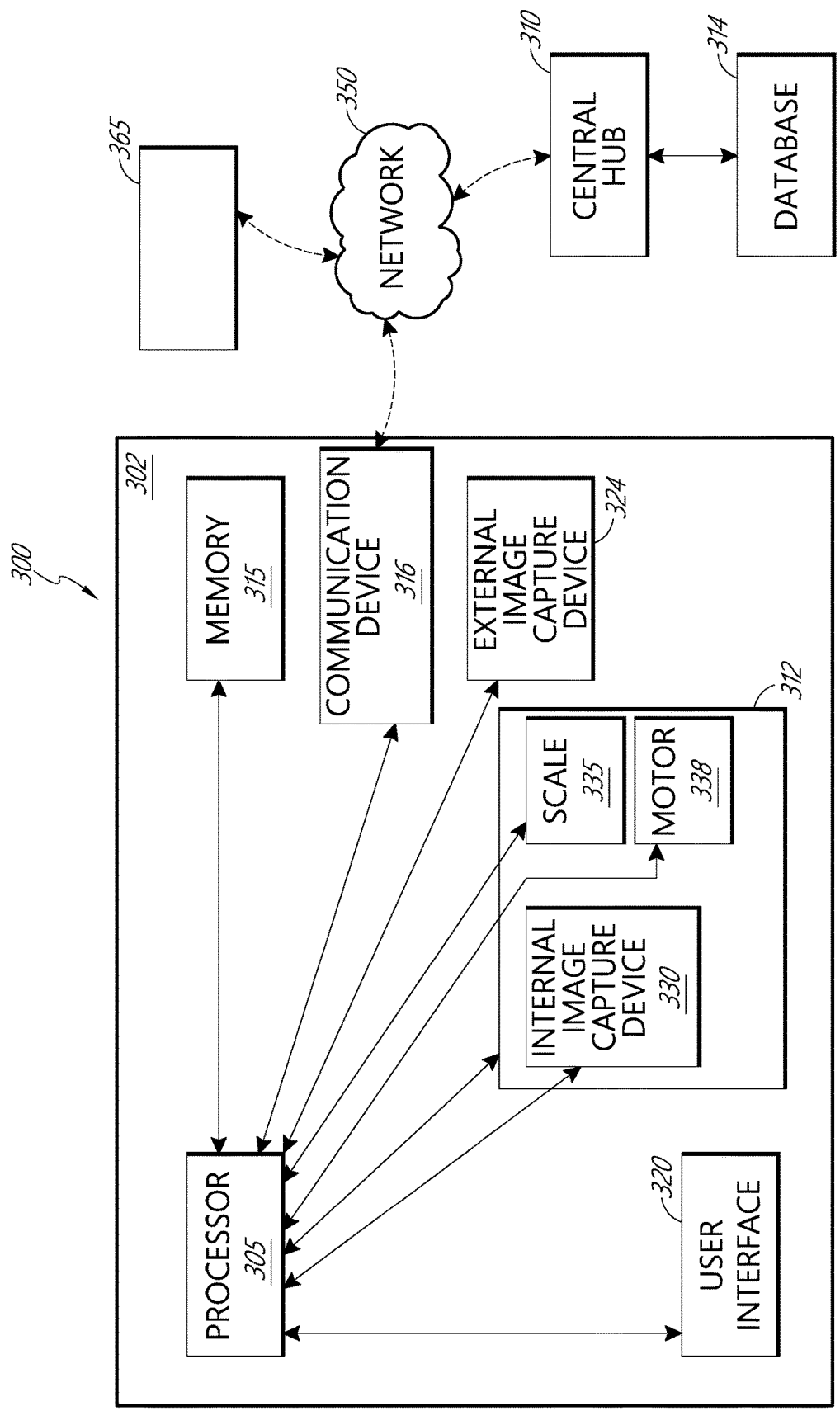

FIG. 3 depicts a block diagram of a control system 302 for an item receptacle 300. The control system 302 comprises a processor 305 in communication with a memory 315, a communication device 316, a user interface 320, and an external image capture device 324, measurement means (e.g., an internal image capture device 330 or a scale 335) and a motor 338. The internal image capture device 330 and the scale 335 can be located inside an item receiving compartment 312 of the item receptacle 300. The measurement means may collect measurement information for a physical characteristic of the item such as weight or size. The measurement information may be compared to the declared characteristics when the label was requested. In this way, the system can ensure that the item for which the label was requested corresponds to the item presented at the item receptacle 300. For example, the label may be requested for a weight of a specified value. If the weight of the item presented at the item receptacle 300 does not correspond to the specified value, the locking means securing the item receptacle 300 may not release to permit induction of the item. Correspondence may include a tolerance such that the specified value is deemed to correspond if the measured value is within the tolerance amount of the specified value. For example if the size was specified as 8"×4"×3" and the item presented is measured at 8.1"×4"×3", if the tolerance amount was 0.1", the discrepancy between the specified value and the measured value may be ignored. However, if the measured value was 9"×4"×3", the values may be deemed to be different enough to prohibit induction of the item using the label. If the measured amount is smaller than the specified value, it may be desirable to permit induction of the item since the service paid for would likely exceed the actual service provided for the smaller item.

The motor 338 can be mechanically connected to the item receptacle so as to move, rotate, or operate the item receptacle. The item receptacle 300 may be any device configured to receive an item, such as a wall drum or a locker, similar to those as described elsewhere herein. The internal image capture device 330 and scale 335 can image and weigh items within the item receptacle 300 as described above. The motor 338 can provide a motive force to a rotatable drum, door, or other enclosing device on the receptacle 300. The internal image capture device 330, the scale 335, and the motor 338 are in electrical communication with the processor 305. In some embodiments, the receptacle 300 can be manually operated and need not include a motor.

The processor 305 is configured to control and receive input from the memory 315, the communication device 316, the internal image capture device 330, the scale 335, the motor 338, the external image capture device 340, and the user interface 320. The memory 315 can store data received from the processor 305 and send data stored therein to the processor 305. The communication device 316 can facilitate the transfer of information between the processor 305 and the network 350, such as by transmitting and/or receiving data from the processor 305 and the network 350.

The processor 305 can similarly control all functions of the item receptacle 300, the internal image capture device 330, the scale 335, the external image capture device 324, and the user interface 320 as described elsewhere herein. For example, the user interface 320 can display a message on a display screen based on input received from the processor 305, and can transmit data to the processor, including input received from a user. The user interface 320 comprises components for a user to input information to the item receptacle 300, such as a keyboard, touchscreen, and the like, and comprises components to output information to a user, such as a display screen, a printer, audio speakers, lights, and the like.

The item receptacle 300 can lock or unlock, receive one or more items, and transmit a status of the item receptacle 300 to the processor 305. The scale 335 can measure the weight of an item within the item receptacle 300 and can transmit a measured weight to the processor 305. The external image capture device 340 can take a picture of a user, a printed or electronic document containing payment information, or any other object within visual range of the external image capture device 340. The internal image capture device 330 can take a picture of an item within the item receptacle 300 and can scan or read a label or a computer-readable code on an item within the item receptacle 300. The processor 305 can receive data including images taken by the internal image capture device 330 and the external image capture device 340, weight information from the scale 335, and/or user input received at the user interface 320. The item receptacle 300 and all subcomponents may be similar to the item receptacle described elsewhere herein.

The item receptacle 300 is in communication with a central hub 310 via a network 350 via the communication device 316. The network can be any communication network configured to transmit data, such as the internet, a local area network (LAN), wireless communication such as Wi-Fi, satellite communication, or any other network capable of transferring data between the item receptacle 100 and the central hub 310. The central hub 310 is configured to communicate with the database 314, such as to retrieve payment information based on item information received from the communication device 316. In various embodiments, the central hub 310 and the database 314 can be located within the control system 302, separate from but directly electrically connected to the control system 302, or in a location remote from the control system 302, such as a data facility configured to provide payment verification for a plurality of control systems. In some embodiments, the database 314 and/or central hub 310 can include cloud computing and/or cloud storage functions. The central hub 310 and database 314 may be similar to the central hub 210 and database 314 described elsewhere herein.

Figure 4:
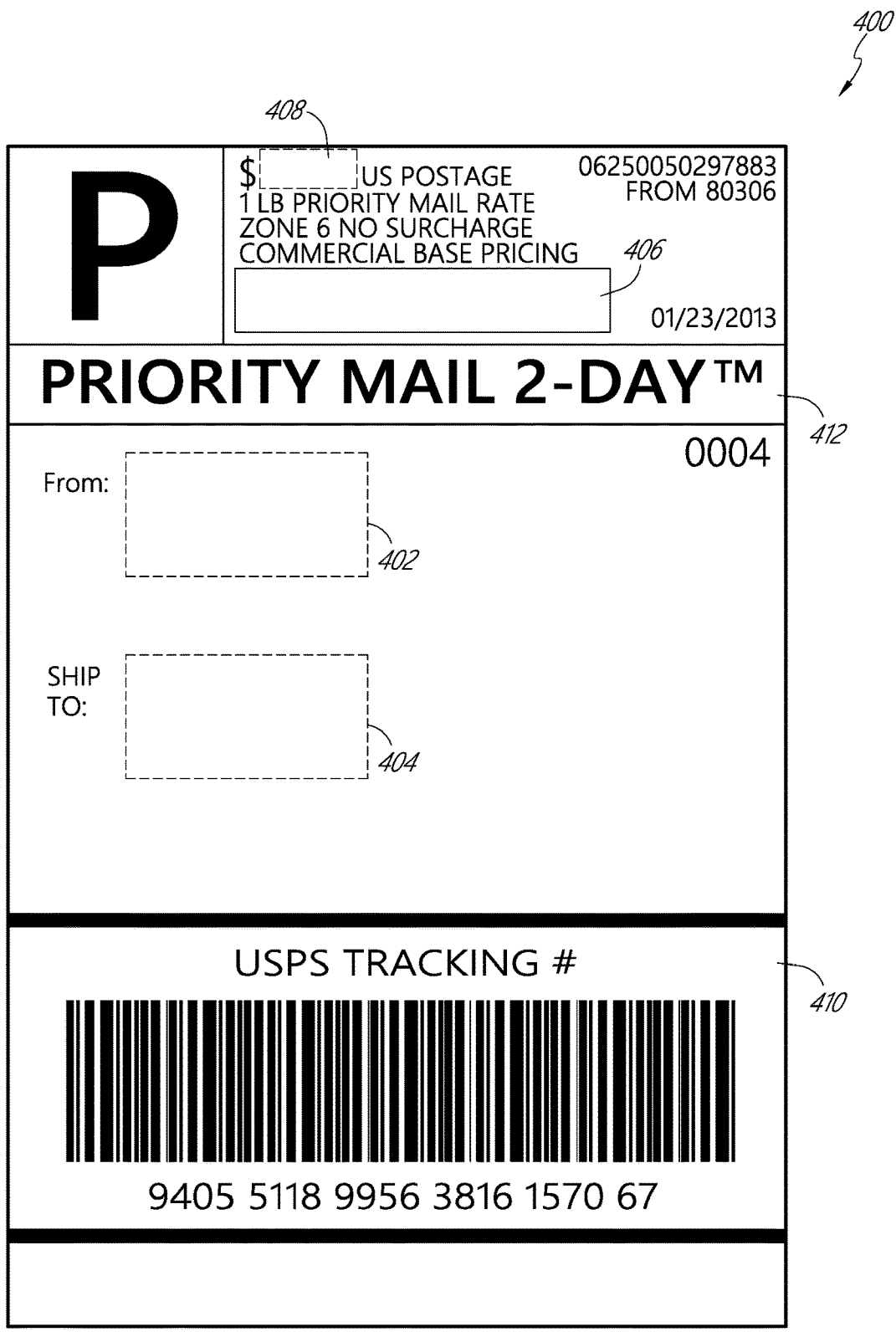
FIG. 4 is an embodiment of a label for use in item distribution.

The label provider 365 can communicate with the central hub 310 and/or the item receptacle 300 via the network 350. For example, the label provider 365 may provide label information to the item receptacle 300 via the network 350. Label information can be provided in a variety of data formats. For example, in some embodiments, the label provider 365 can create a label and send the label information to the central hub 310 and/or the item receptacle as an image file such as a .jpg, .gif, .pdf, and the like. In some embodiments, the label provider 365 can create a label and send the label information to the central hub as a data file such as a mail.dat file, a computer-readable code encoding the label information, a computer-readable code encoding a pointer or identification of a data file containing the label information, from which the label information can be extracted at the central hub 310 or at the item receptacle 300. As will be described herein below, the label information from the created label can be received, read, converted if necessary, and generated as a physical label FIG. 4 depicts an embodiment of a label 400. The label 400 includes several data fields with specific data and is arranged in a standardized or mostly standardized format, for ease of use throughout a distribution network. The label 400 comprises a sender identifier 402, a recipient 404, computer-readable indicia 406, postage information 408, a tracking code 410, and a service class identifier 412. A label of the present disclosure can contain none, some, or all of the fields described with regard to exemplary label 400. The label 400 can comprise any desirable combination of label elements. For example, in some embodiments, postage information 408 may be omitted. In some embodiments, the label can comprise only the computer-readable indicia 406.

The sender identifier 402 and recipient 404 can identify the sender of the item to which the generated label 400 will be or is affixed. The sender identifier 402 can be a mailer identification number, a return address, the address of the sender (e.g., sender address), or other desired information. The recipient 404 can be identified by a delivery point identifier, a street address, a virtual address, a recipient identifier, and the like. The computer-readable indicia 406 can be a machine readable identifier, such as a one or two-dimensional barcode, a four state barcode, information-based indicia barcode, or other barcode, or any other desired computer-readable code. The computer-readable indicia 406 can encode one or more pieces of information from the label 400, such as the sender identifier 402, the recipient 404, postage information 408, the service class identifier 412, or any combination thereof. In some embodiments, the computer-readable indicia can encode an identifier of the item receptacle 100 where the label was generated, an identifier of the entity requesting generation of the label, an identifier of the entity creating the label, or any combination of these. In some embodiments, the computer-readable indicia can comprise a label key, as will be described elsewhere herein. In some embodiments, the label key can be located on the label separate from the computer-readable indicia 406.

The computer-readable indicia 406 can also include a unique identifier component which associates a label with the item on which the label is placed. For example, where 10 parcels are addressed to the same recipient or delivery point, the computer-readable indicia will include a similar or identical portion for each of the 10 parcels, which identifies the delivery point, the sender, and/or any other desired information. For these 10 parcels, an additional field or encoding can be present in the computer-readable indicia 406 which uniquely identifies each item of the 10 items. In this example, the label 400 can include an additional field having a unique identifier to differentiate each label 400 from other labels, specifically, from the other 9 labels intended for delivery to the same delivery point. The unique identifier may also indicate that a label 400 was generated using a smartphone 236 and the label broker system described herein.

Figure 5A:
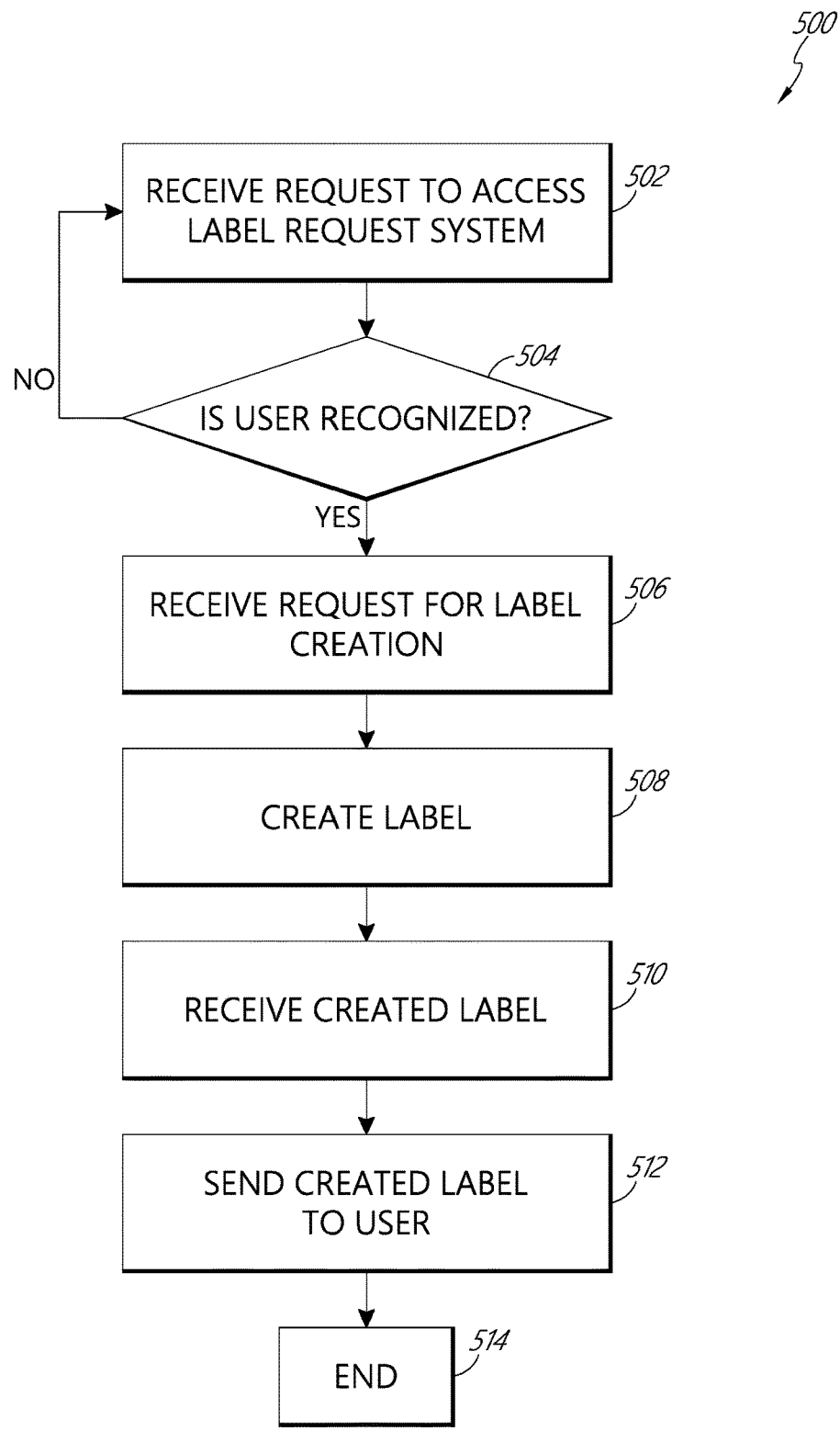
FIG. 5A is a flowchart depicting an embodiment of a process 500 for creating a label

FIG. 5A is a flowchart depicting an embodiment of a process 500 for requesting creation of a label. The process 500 begins in block 502, a request to access the label request system is sent to the label provider system 220. The request can be from a computer terminal 232, a smartphone 236, an item receptacle 238, or from another source, such as an interface provided by or providing access to the e-commerce merchant 226. The request to access the label provider system 220 can come in the form of entering login credentials to a website associated with the postage provider 222, such as the USPS's website, a website associated with the third party provider 224, or by logging into or opening an application on the smartphone 236, such as the USPS application, a third party application, or an e-commerce merchant application.

The process 500 then moves to a decision state 504 wherein the process determines whether the user request to access the label provider system 220 is recognized. If the user is not recognized, the process returns to block 502, wherein a request can be re-received. if the user is recognized, that is, if the login credentials are recognized, or the smartphone running the application is authenticated or recognized, the process moves from block 504 to block 506, wherein the request for creation of a label is received.

The request for creation of a label can comprise a user inputting information related to the item for shipment, such as sender information, recipient information, item dimensions, item weight, item value, destination information, and other desired information via the user interface system 225. This information can be provided to the label provider system 220 via the user interface system 225. In some embodiments, the user interface system 225 can provide label creation request communications via label creation request communication connection 215 directly to the label provider system 220. In some embodiments, such as where an item is purchased from the e-commerce merchant 226, the label information can be provided by the e-commerce merchant 226, who may have stored item dimensions, item weight, sender information, and the like. In some embodiments, the request for creation of a label can occur in the label request system 230. For example, a user may request generation of a label at the item receptacle 238 or at the mobile terminal 232 while at a retail counter. In this embodiment, the central hub 210 receives the request to create a label from the label request system 230 and sends the label creation request to the label provider system 220.

The process 500 then moves to block 508, wherein the label is created by the label provider system 220. The creation of the label can comprise creating an electronic label, such as an image of a label, .jpeg, .png, .pdf, or other similar file format. In some embodiments, the created label can be a data file, such as a mail.dat file or other type of file. The data file can include the label information used to create the label, for example, sender identifier 402, recipient 404, computer-readable indicia 406, postage information 408, tracking information (e.g., tracking code 410), and service class information (e.g., service class identifier 412), or any combination of these. In some embodiments, creating the label can comprise collecting payment for shipping or postage, and postage information, payment indicia, and the like can be included in the created label. For example, the label provider system 220 can debit a user account for payment or postage, requesting payment for postage from the user via the computer terminal 232, the smartphone 236, or the item receptacle 238. The payment or postage information becomes part of the created label.

The process moves to block 510, wherein the created label is received in the central hub 210. As described above, the created label is an electronically created label. The created label is received in the central hub 210 from the label provider system 220 via the inbound communications 217. In some embodiments, the label is sent to the central hub 210 and stored in the memory 214 as an image of the label, such as a .jpeg, .png, .gif, .pdf, or the like. In some embodiments, the label is sent as information indicative of the label, and can be a data table or other information that can be populated into label fields by the central hub 210 or by the label request system 230. The central hub 210 generates a label key in response to the label information provided to the central hub 210 from the label provider system 220. The label key can be a computer-readable code, an alphanumeric string, or the like. The label key is associated with the created label and stored in the memory 214. The central hub 210 can then provide a label key to the label provider system 220. In some embodiments, the label provider system 220 can generate the label key and associate the label key with the created label.

The process moves to block 512, wherein the created label, that is, the electronic version of the label, is sent to the system, apparatus, or other entity/device that requested label creation, such as the smartphone 236. In some embodiments, sending the created label to the device requesting creation comprises sending the label key to the device that requested label creation as a computer-readable code, an image of a computer-readable code, and/or in human readable text. In some embodiments, only the label key is sent to the device that requested label creation as a computer-readable code or alphanumeric code. In some embodiments, the label provider system 220 can generate an alphanumeric code and send the alphanumeric code to the entity/device that requested label creation. The alphanumeric code can be associated with the label key and/or the electronic version of the label. In some embodiments, where the label creation was requested by a component of the label request system 230 or the user interface system 225 via the label request system 230, the created label, or electronic label, is sent to the user interface system 225 or the label request system 230. The created label can be sent to a requestor through the same device, platform, or service by which the requestor requested the label. In some embodiments, the requestor can choose how to receive delivery of the label. For example, a requestor may request creation of a label via a computer terminal 233 and may request the electronic label and/or the label key to be delivered to the requestor's smartphone 236. The created label and/or the label key can be sent to the requestor in one or more ways. In some embodiments, the created label can be sent to the requestor as an image of the label, such as a .jpeg, .png, .gif, .pdf, or the like. The label key can be sent to the requestor as a computer-readable code, a token to store on the smartphone 236, or through any other desired means. In some embodiments, where the central hub 210 received the created label as an image, the central hub 210 can send the created label as an image to the requestor. In some embodiments, the central hub 210 can use label information to fill in label fields and create an image of the label, and send the image of the label to the requestor.

In some embodiments, the central hub 210 can send the label key, such as computer-readable code to the user interface system 225, where the code is associated with the label information stored in the memory 214. In some embodiments, the central hub 210 can send the label information to the requestor in a data file. In some embodiments, the central hub can send the label key or computer-readable code associated with the label information, or send an image of the label key or computer-readable code such computer-readable code to the computer terminal 232, the item receptacle 238, or the smartphone 236. The label key can be used by the requestor or user to access the label information, to update label information via an application or website, cancel the label, or request a refund. The label key can be associated with the created label information. The label key can also comprise additional components, such as a source identifier which identifies the entity that created the label. The label key will be unique for each label created and/or generated by the system 200. In some embodiments, the label provider system 220 sends the label key to the smartphone 236 directly.

The process 500 moves to block 514, where the process ends.

In an exemplary embodiment of a process 500, a user may request label creation using the smartphone 236. The creation request may be submitted at a time that is different from the generation of the label. In this way, the printing of the label can be decoupled from the creation of the label. The decoupling may be geographic such that the request to create the label may be received from a first device at a first location and the request to generate a physical label may be received later in time, from a different device at a different location. As such the decoupling may also include temporal decoupling such that generating the physical label can be deferred until a point in time after the label is created.

The user can access a website or a specific application configured to communicate with the label provider system 220. The user can order an item to be shipped from the smartphone 236 and be instructed to enter shipping details along with the purchase of the item. The application can access a user's payment account information, which can be stored on the smartphone 236 or in a remote memory. The user requests the label creation for the purchased item from the smartphone 236, which sends the label creation request via the label request communication connection 215 to the label provider system 220.

The label provider system 220 creates the electronic label and sends a label key, such as a computer-readable code (QR code, barcode, and the like) or an alphanumeric string to the smartphone 236. In some embodiments, the label provider system 220 may also receive a location of the smartphone 236 at the time of purchasing the item. This can be provided from the GPS system of the smartphone 236, or from other location awareness features of the smartphone 236. The label provider system 220 can additionally send to the smartphone 236 locations, addresses, and the like, of induction points nearest the user and the smartphone 236. In some embodiments, the user can request locations of the nearest item induction points in the application. The induction points can be places where the created label can be generated, and the item inducted into the distribution network, such as a retail counter, a post office, an item receptacle 238, or other similar location. In some implementations, a threshold distance may be provided for a location to define an area within which a device may generate a physical label. For example, if the physical label is to be generated for an item by a delivery agent, it may be desirable to confirm that the delivery agent is proximately located to the sender's location before generating the physical label. The proximity may be assessed using a threshold distance, such as a geofence, which may be defined as a system configuration value or specific to the label being generated (e.g., label broker security requirements, value of item to be inducted, value of the distribution services authorized by the label, etc.).

In some embodiments, the application will provide induction locations for the induction points that are near or within the ZIP code entered by the user when requesting label creation.

In some embodiments, the user can select an induction point from the list of locations and request generation of a label at a particular induction point. This will instruct the selected location to generate the label, which can then be picked up by the user. In some embodiments, the user can request that the label be generated at a certain time in the future, or within a time window, when the user expects to be at an induction point. By so doing, the generated label will not be generated but not picked up for a long period of time, and the user can avoid standing in a line to request label generation.

Figure 5B:
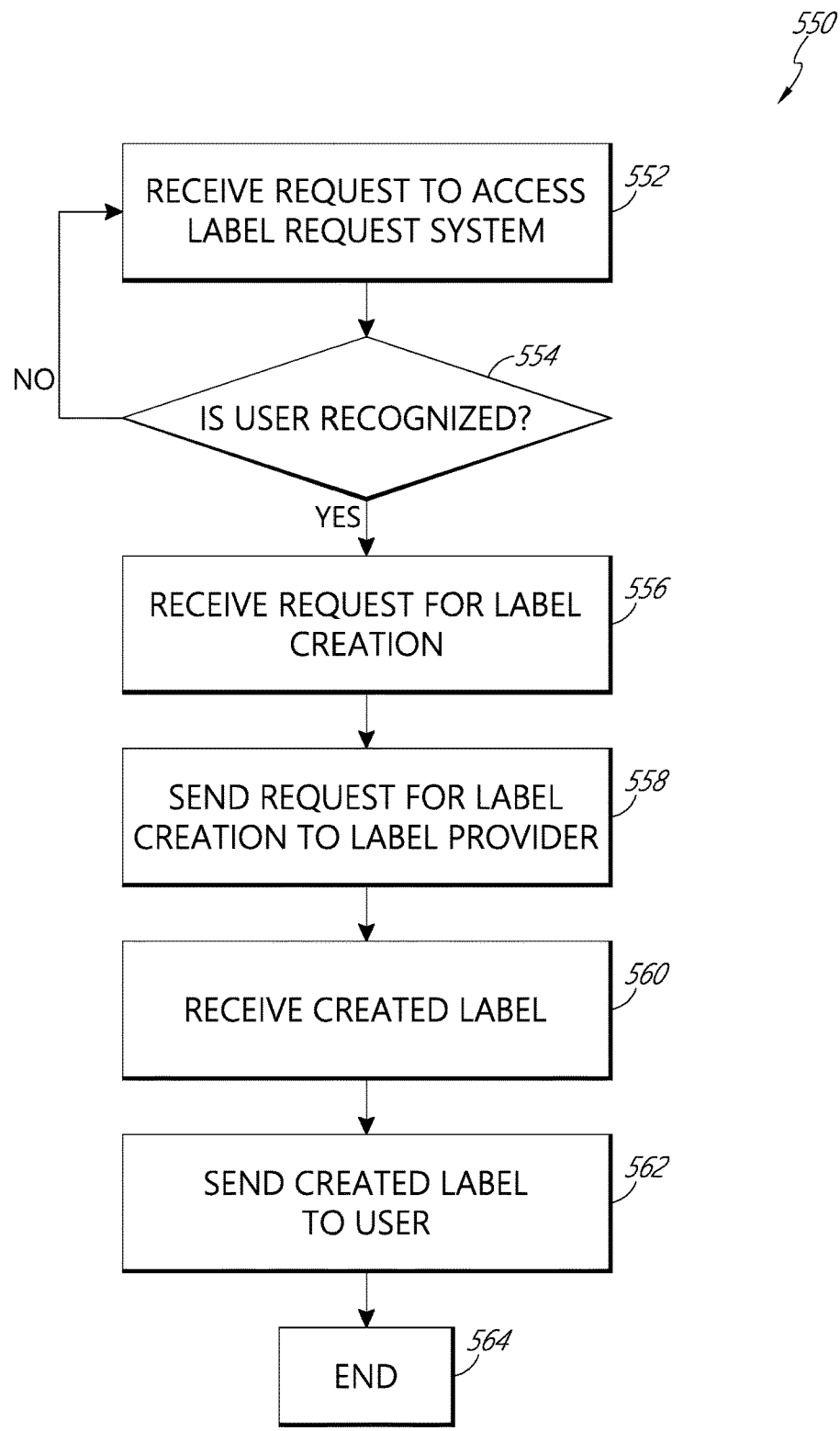
FIG. 5B is a flowchart depicting an embodiment of process for creating a label.

FIG. 5B is a flowchart depicting an embodiment of a process 550 for requesting creation of a label via the central hub 210. The process 550 begins in block 552, wherein a requests access to the label request system. The request can come from the user interface system, for example, from the smartphone 236 or the computer 233. The request to access the label request system can come in the form of entering login credentials to a website associated with the distribution network, such as the USPS's website, or by logging into or opening an application on the smartphone 236, such as the USPS app.

The process 550 then moves to a decision state 554 wherein the process determines whether the request to access the label request system is recognized. If the user is not recognized, the process returns to block 552, wherein a request can be re-received. if the user is recognized, that is, if the login credentials are recognized, or the smartphone running the application is authenticated or recognized, the process moves from block 554 to block 556, wherein the request for creation of a label is received in the user interface system 225. The requests for label creation can occur in an application running on the smartphone 236 or as a website on the computer terminal 233.

In some embodiments, the website or application can have access to information in the user's smartphone 236. For example, the application may have access to the contacts and/or images on the smartphone 236 and may have access to many other areas of the device. To identify a recipient for the item to be shipped or sent, a smartphone user could simply click or tap on a contact listing in the smartphone 236 and the application can pull the contact information, including address, phone, etc., and incorporate that information into the label request for incorporation into the label.

The user can send or swipe the contact to the label provider system 220 via label creation request transmitted via the label request communication connection 215 or another communication connection. The label provider system then then formats and standardizes the address or name and address for use on the label. The label provider system 220 can also lookup the address for zip code correction and zip+4 or zip+9 inclusion on the label. The label provider system 220 also has access to an address database to see if the address or name and address has a forwarding address. If there is a forwarding address stored in the database, the label provider system 220 creates the label using the updated or forwarding address. These corrections can automatically be done so that the proper forwarding address is used with the label. If a forwarding address or new address is identified, the application or website may also prompt the device to request that the user confirm the user wishes the forwarded address.

In some embodiments, the user can provide a photograph of an item, or a location or a person to whom the item will be sent. The label provider system 220 can access a USPS database, such as the household address database wherein the photo or image of a recipient or delivery destination may be stored. The label provider system 220 can query a household database using the provided image to find a match, or corresponding photograph and delivery point details, such as an address and name for inclusion on the label. The household database can be similar to that described in U.S. application Ser. No. 15/281,615, filed Sep. 30, 2016, the entire contents of which are hereby incorporated by reference.

In some embodiments, the image provided to the website or application can be a photo of another package or piece of mail with a name and address displayed. The label provider system 220, or the website or application, using another system, can process the image and extract the name and address for inclusion on the label.

In some embodiments, the image can be a unique image, such as a sunset, a landscape, a face or picture of addressee, a drawing, a handmade item, or the like. The website or application, or a connected system can then process the image to see if there is a match between the provided image and an identical or corresponding image and associated name/address or address in a household database maintained by the distribution network. The distribution may utilize anonymous addresses or vanity addresses associated with physical delivery points or addresses. For example, the website or application, or another computer system, including the label provider system 220, or one to which the label provider system 220 is attached, can perform image recognition to identify a recipient based on a provided photograph of an intended recipient for the item. A photograph of the recipient can be stored in the household database, and the website or application can analyze the provided image, such as using facial recognition software, to identify the recipient. The recipient will have a delivery point associated with him or her which can be used in label creation.

The unique images described here can be entered and populated into the database by individuals or potential recipients who wish to be able to receive items based on an image, or by senders or third parties simply by logging on to usps.com and uploading the image to the household database, which is in communication with the website, application, and/or the label provider system 220. For example, a person who wishes to keep his or her address anonymous, can upload an image to the household database, and provide a name/address or address when prompted. The image is then associated in the household database with the address and can be used for addressing by anyone having the image and providing the image to the website or application. In some cases, like faces, photos of people, landscapes or the like the website or application, or the label provider system 220 may process the image to obtain an address by calling out to another connected database, or a third party database for matching. Where a user wishes to keep an address or other information anonymous or private, the website or application does not provide the address or other information to the website or application and does not provide a human readable address on the label, but provides only a computer-readable address, or code indicating the delivery point or address on the label, when created and generated.

In some embodiments, the processing of the image can determine whether there is any delivery point information in the image itself or any metadata embedded with the image file. In some embodiments, the image may be an image taken inside or near a house, business, school, or other location. The image can have a geo-coordinate associated with the location. The geo-coordinates can be matched in a delivery point database to which the website, application, and/or the label provider system 220 have access. The geo-coordinates are converted to an address or a computer-readable code encoding the delivery point, and is sent to the website or application for verification by the user. In certain circumstances for privacy or from addressees request the name may not be included in the verification request. If the addressee prefers not to have any verification sent when using this method, the web site or application may not send any address back to the smartphone 236 or can simply send a message saying no match found.

The website or application can send a confirmation prompt to the smartphone 236 so that the user can verify the address identified from the household database which is to be included with the label. If the user confirms the address, the website or application sends a verification response to the label provider system 220 to include the address with creation of the label.

In some embodiments, the user requesting creation of a label can click on a contact record or entry, a cell phone number, email address, twitter handle, customer or e-commerce merchant name or the like within the user's smartphone 236. The information is then sent to the website or application, the label provider system 220, or the connected household database, and the household database can match the cell phone number, email address, twitter handle, customer or e-commerce merchant name or the like to an associated name/address stored in the household database. In some embodiments, the website or application sends back a stealth, anonymous, or vanity address to the label provider system 220 for verification/confirmation. The website or application also sends the stealth, anonymous, or vanity address, or a computer-readable code indicative of the intended recipients name and address, to the label provider system 220 for inclusion on the label. These stealth or anonymous addresses include a generic descriptor such as "addressee," a city and state but leave off the specific name and address. These labels can be created, generated, and then placed on the item. When the item processing equipment within the distribution network, such as the USPS, reads the label, the USPS systems read the computer-readable code on the label, and use the code to determine the destination for the item.

In the case of an e-commerce seller/buyer, twitter handle or the like, the website or application, or connected systems, may contact the e-commerce system, Twitter or other databases for the address information corresponding to the provided seller/buyer name, twitter handle, etc. These databases can send back not only the address but also the preference for the address like stealth only, no contact, or forwarding info. These processes with the e-commerce system, Twitter, and the like can be opted into by the party who wishes to receive items based on the e-commerce system, Twitter, etc., handle or user name.

The website or application can also collect identifiers of the smartphone 236 being used to perform the label creation request, such as an ESN, MEID, IMEI, chip id or cell number to include in the database record for later verification or authentication. An identifier for the smartphone 236, or an association with the smartphone 236 can be stored in the label record in the hub 210 for use in subsequent label generation.

The request for creation of a label can comprise a user inputting information related to the item for shipment, such as sender information, recipient information, item dimensions, item weight, item value, destination information, and other desired information.

The process 550 then moves to block 558, wherein the request for label creation is sent to a label provider system 220 via the label request communication connection 215. In some embodiments, the request for label creation from the user can indicate which component or label provider of the label provider system 220 is to be used for creation of the label. In some embodiments, label provider system 220 can triage or distribute requests for label creation to postage provider 222 and the third party provider 224 according to a specified pattern, such as alternating, or according to geographic location of the label requester. In some embodiments, the label requestor can be a retailer, a store, a fulfillment warehouse, and the like, which may have an account with the distribution network, and may be affiliated with an e-commerce merchant 226. In this case, requests for labels from commercial entities can be sent to the e-commerce merchant 226. In some embodiments, the label requester and the e-commerce merchant 226 can be the same entity. In some embodiments, the label creation communication can be routed to the central hub 210, which can then provide the label creation request to the label provider system 220. In some embodiments, where the e-commerce merchant 226 requests creation of the label, the e-commerce merchant 226 may request the label on behalf of a recipient. The e-commerce merchant 226 may request label creation on behalf of a user, such as an item sender or item provider. For example, the e-commerce merchant 226 may request an electronic label on behalf of a user where the e-commerce merchant 226 has facilitated a transaction between a sender and a recipient. The e-commerce merchant 226 can receive the label key from the label provider system 220, and can send the label key, the computer readable code, alphanumeric code, and the like to the user, which the user can then use to request generation of a physical label as described herein.

The process moves to block 560, wherein the created label is received. As described above, the created label can be an electronically created label. The creation of the electronic label can include debiting a user account for payment or postage, requesting payment for postage from the user via the computer terminal 232 or the smartphone 236. The payment or postage information becomes part of the created label. The created label, or the electronic version of the label is sent by the label provider system 220 to the central hub 210. As described above, the created label can be received as a virtual label, such as an image of a label, .jpeg, .png, .pdf, or other similar file format. In such case the image of the label is received and stored in the memory 214. In some embodiments, the created label can be a data file, such as a mail.dat file or other type of file which includes the label information used to create the label, for example, sender identifier 402, recipient 404, computer-readable indicia 406, postage information 408, tracking information (e.g., tracking code 410), and service class information (e.g., service class identifier 412), or any combination of these. The data file is stored in the memory 214. The label provider system 220 also sends a label key, such as a computer-readable code, an alphanumeric string, or the like, along with the created label or label information to the central hub 210. The label key is associated with the created label and stored in the memory 214.

In some embodiments, when a label is created, information regarding the user or requestor can be collected by the central hub 210. For example, where the requestor uses a smartphone 236 to request label creation, the location, such as the GPS coordinates of the smartphone 236, can be recorded and stored. Knowing the location of the smartphone 236 requesting the label can be provided to the distribution network. The location information can be automatically sent to a carrier who will be alerted via the mobile delivery device 234 that a label has been requested and instructing the carrier to proceed to the location of the smartphone where the label was requested to pick up the item. In some embodiments, the location of the smartphone 236 can be stored and compared to a known address of the requestor.

The process moves to block 562, wherein the created label is sent to the user requesting the label, such as the user interface system 225. The created label can be sent to a requestor through the same device, platform, or service by which the requestor requested the label. In some embodiments, the requestor can choose how to receive delivery of the label. For example, a requestor may request a label via a computer terminal 233 and may request the label be delivered to the requestor's smartphone 236. The created label can be sent to the requestor in one or more ways. In some embodiments, the label can be sent to the requestor as an image of the label, such as a .jpeg, .png, .gif, .pdf, or the like.

In some embodiments, the label provider system 220 sends a label key, such as computer-readable code to the requestor, which is associated with the created label and the label information stored in the memory 214. In some embodiments, the label provider system 220 can send the label information to the requestor in a data file. In some embodiments, the label provider system 220 can send the label key or computer-readable code associated with the label information, or send an image of the label key or computer-readable code such computer-readable code to the computer terminal 233 or the smartphone 236. The label key can be used by the requestor or user to access the label information, to update label information via an application or website, cancel the label, or request a refund. The label key can be associated with the created label information. The label key can also comprise additional components, such as a source identifier which identifies the entity that created the label. The label key will be unique for each label created and/or generated by the system 200.

The process 550 moves to block 564, where the process ends.

Although processes 500 and 550 are provided as two examples of processes for requesting a label, the processes are exemplary only, and processes which mix, combine, or select the descriptions, elements, of one or more steps of processes 500 and 550 are explicitly contemplated by the present disclosure.

Figure 6:
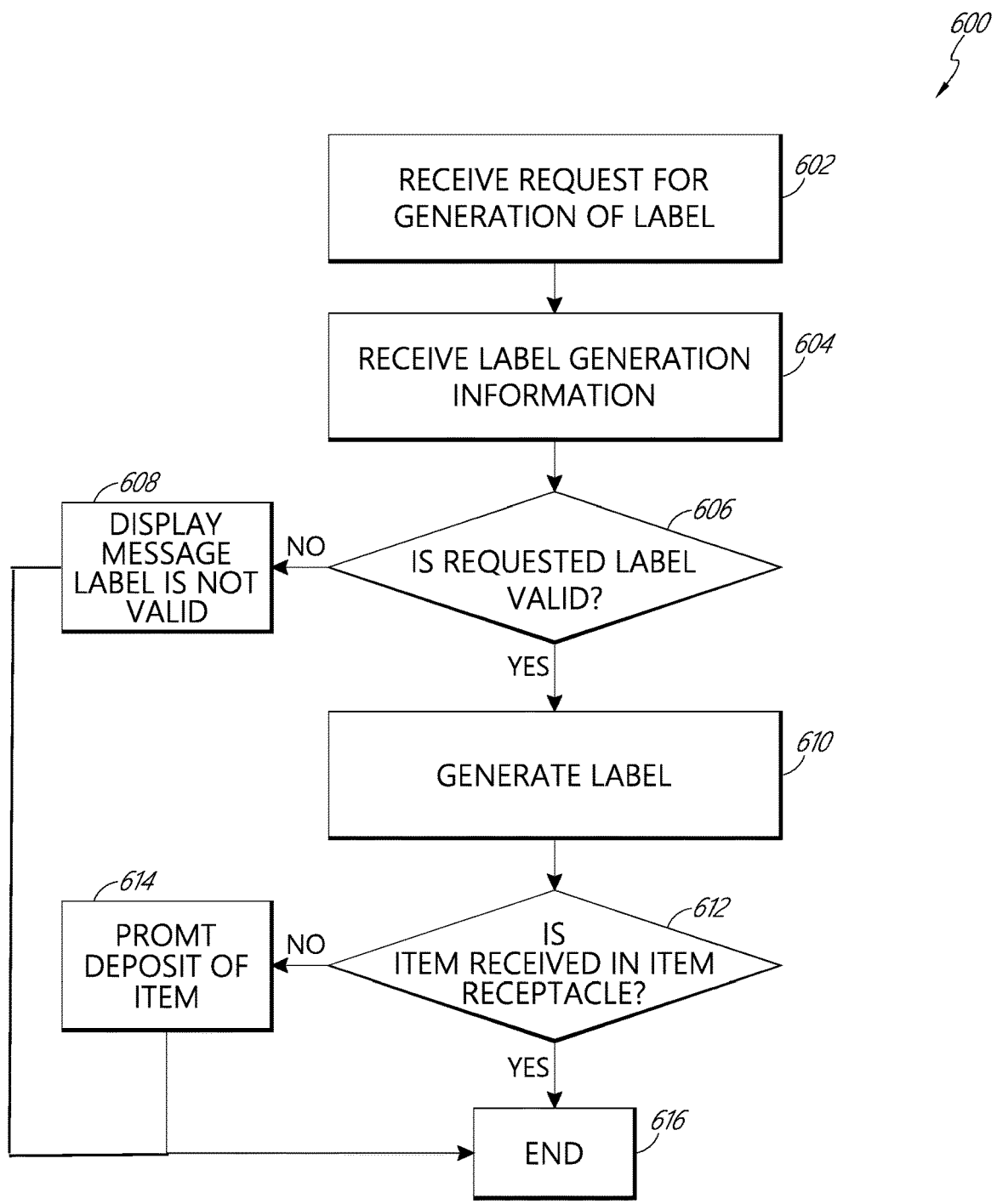
FIG. 6 is a flow chart depicting an embodiment of a process for generating a label.

FIG. 6 depicts a flow chart of a process 600 for requesting generation of a label. The process 600 begins at block 602 wherein a request for label generation is received at the label request system 230. The request for label generation can occur at the item receptacle 238, or at a facility associated with the distribution network, such as at a computer terminal 232, which may be located at a post office. The request for label generation can be made by a user interacting with the label request system 230.

The requestor of the generated label can be the entity that requested creation of the label as described with regard to FIG. 5A or 5B. The generation requestor can approach the item receptacle 238 and select an option on the user interface for generation of a label. In some embodiments, the user can scan a label key located on the smartphone 236 at a scanner on the item receptacle 238, or at the computer terminal 232. The generation requestor can bring the item to be sent to the item receptacle 238, ready to receive the generated label.

The process 600 moves to block 604 wherein label generation information is received. This label information can be received from the generation requestor via the user interface 120 on the item receptacle 100 (or to a similar component on item receptacle 238). For example, the user interface 120 can request the user input label generation information and may prompt the user to scan a computer-readable code, the label key, or the image of the label via the sensor 124. The requestor can navigate on the smartphone 236 to the received label information and hold the smartphone 236 in proximity to the sensor 124. In some embodiments, the requestor displays the label key or computer-readable code received in response to the request for label creation on the smartphone 236, and holds the smartphone 236 in proximity to the sensor 124. The sensor 124 reads the computer-readable code from the smartphone 236 via optical recognition, a barcode scanning, or the like.

In some embodiments, the requestor displays on the smartphone 236 the image of the label received during the request for label creation and holds the smartphone 236 in proximity to the sensor 124, wherein it is read, scanned, imaged, or otherwise input. In some embodiments, where the image of the created label is displayed, the sensor 124 can read the computer-readable indicia 406 on the image of the label.

In some embodiments, the processes described above with regard to FIGS. 5A and 5B, and FIG. 6, can be performed while a user is physically present at the item receptacle 238. For example, the user can connect his or her smartphone 236 to the item receptacle 238 via a wireless protocol, such as Bluetooth, or another desired protocol and communicate with the system 200 via the item receptacle 238. The item receptacle 238 can be in communication with the label provider system 220 and can provide and receive information from the label provider system 220. In some embodiments, a user can bring an item to the item receptacle 238 and access the label provider system 220 via the item receptacle. The user can provide the information described elsewhere herein and request creation and generation of the item at the item receptacle 238.

A user may interact with the item receptacle 238 using voice commands to instruct the item receptacle 238 regarding generating the label. In this case the item receptacle 238 can have a microphone connected to speech recognition software. The voice commands can be provided with the computer-readable code, and/or can be provided on the item receptacle. The user can speak a code, provided by the label provider system 220 and then to the smartphone 236, to the item receptacle 238, and the item receptacle In some embodiments, the user can be present at the item receptacle 238 and input a code or identifier on the item receptacle into the user's smartphone 236, which tells the hub 210 and the label provider system 220 where the user is, and where the label should be generated. The application on the smartphone 236 can communicate with components of the system 200 through the item receptacle 238 and/or through wireless communication methods, such as Wi-Fi, cellular, LTE, and the like.

In some embodiments, the user can connect to the item receptacle using a pairing protocol, such as Bluetooth, NFC, or the like. The software application on the smartphone 236 can be configured to provide a token, or security identifier to the item receptacle via the pairing protocol to confirm the identity of the smartphone 236 as the phone which requested label creation. The application can also automatically transmit the label key via the pairing connection to the item receptacle 238. The item receptacle 238 uses the label key to identify which label is to be generated and confirm the identity of the smartphone 236 that requested creation of that label. When the pairing is established, the identity confirmed, and the label key provided, the item receptacle 238 can automatically provide the label to the user. In this way, the user does not need to physically interact with the item receptacle 238.

In some embodiments, the item receptacle 238 can be continuously or at intervals, scanning for nearby smart devices. When a smart device is detected, the item receptacle 238 can access a database of labels provided and smartphone identifiers associated therewith. When the item receptacle identifies a match, the item receptacle can send a notification to the smartphone 236 that the item receptacle is nearby and that there is a label to generate. In some embodiments, the notification can include an interaction feature to receive an instruction to generate the label.

The process 600 moves to decision state 606 wherein it is determined if the requested label is valid. To determine if the label generation information is valid, the item receptacle 100 transmits the received generation information to the central hub 210, where the central hub 210 queries the memory 214 to determine whether label information corresponding to the information received via the request is present in the memory 214. The memory 214 can also store information related to the time and date of creation of the label, whether the label has been generated (printed) previously, the date and time of generation of the label, whether the label has been used before, or any other desired information.

With information received from memory 214, the central hub 210 determines whether the request for label generation has occurred within a specified time period from the request for creation of the label. In some embodiments, the created label may be valid for a day, a week, a month, two months, six months, a year, or any other desired time period. If the request for generation of the label occurs after the specified time period, the process moves to block 606 and displays a message that the label is not valid.

In some embodiments, the central hub 210 can determine that the requested label has already been generated previously, or upon a prior request. If the label has previously been requested, the central hub 210 can return a message that the label is not valid, or cannot be generated, as in block 608. In some embodiments, the central hub 210 can determine, via interfaces to other systems of the distribution network not described here, that the label has already been scanned on an item in the distribution network and can determine the label cannot be generated. In some embodiments, the central hub 210 can determine that postage has not yet been paid for a created label, and the user interface 120 can request a payment be made before the label can be generated. Once payment has been received, for example, via payment device 126, the process can continue.

If the requested label is valid, or can be generated, the process 600 moves to block 610, wherein the label is printed via the printer 128 using the label information stored in the memory 214. The generated label can be a self-adhesive label which the requestor can affix to the item.

The process moves to decision state 612, wherein it is determined whether the item has been deposited into the item receptacle 100. A requestor generally will take the generated label and affix the generated to the label. The item with the affixed label is then deposited in the item receptacle 100 to induct the item into the distribution network. The item receptacle 100 can detect whether the item has been deposited via the internal image capture device 330, the scale 335, a sensor on the rotating drum of the item receptacle, or other detection method. If the item is not detected, the process moves to block 614, wherein the user interface 120 displays a prompt to deposit the item in the item receptacle 100. The process then ends in block 616.

If the item has been detected in the item receptacle 100, the process 600 moves to block 616, wherein the process ends. In some embodiments, the printer 128 can provide a receipt of item deposit.

Figure 7:
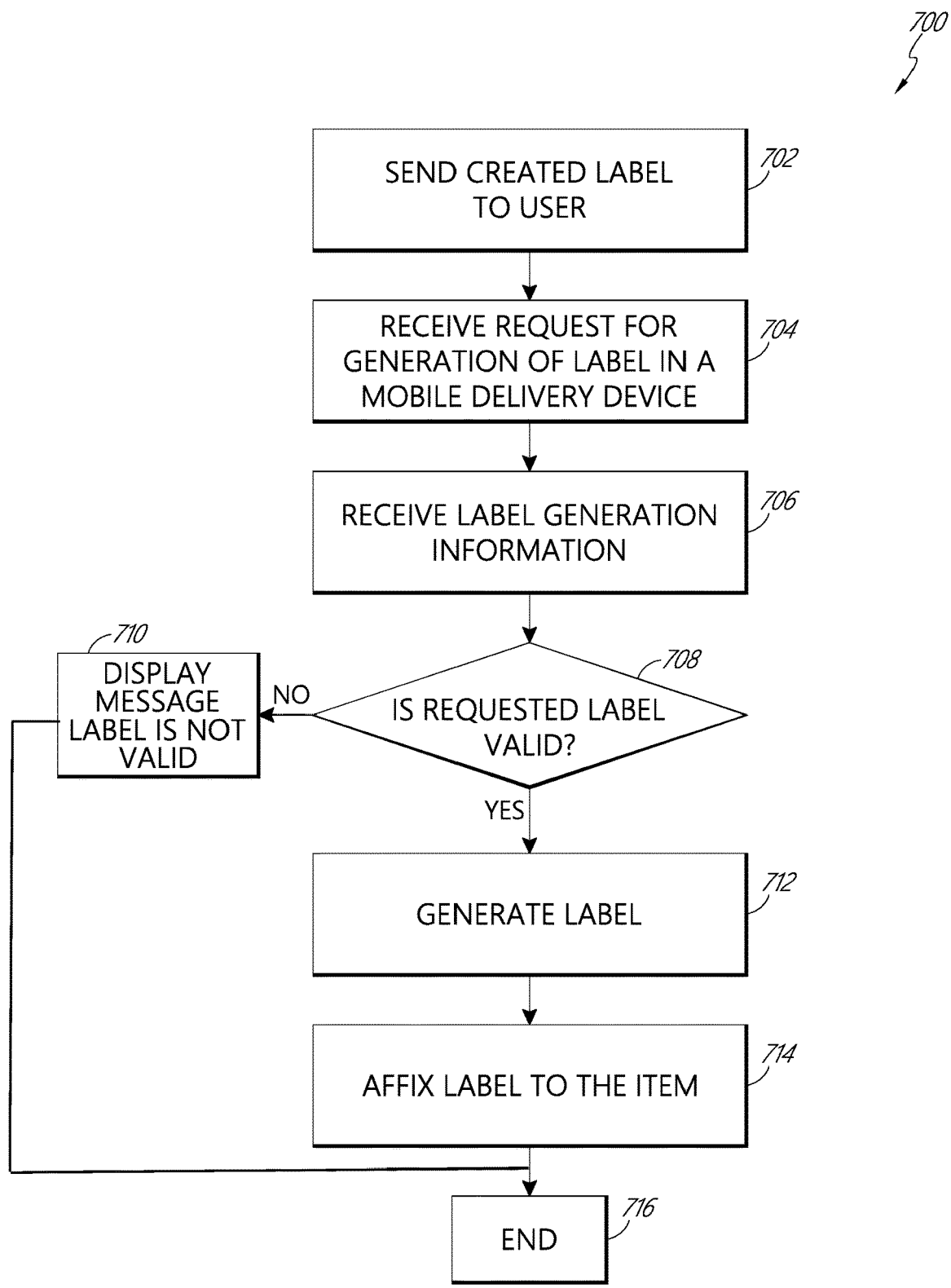
FIG. 7 is a flow chart depicting an embodiment of a process for generating label a label using a mobile delivery device.

FIG. 7 is a flow chart depicting a process 700 for generating a label using a mobile delivery device, such as mobile delivery device 234. Process 700 begins where a created label is sent to a user or label requestor. This process can be similar to process 500, wherein a request for label generation occurs and a request for label creation is received, and a label is created and sent to the user or requestor.

The process 700 then moves to block 704, wherein a request for label generation is received in a mobile delivery device. In some embodiments, this occurs as a delivery resource, such as a carrier, receives a notification on the mobile delivery device 234 that a customer, sender, requestor, user, or other entity has an item for pickup, which is to be delivered via the distribution network. This notification is generated and send to the carrier in response to the request for label creation and the created label being sent to a user. The central hub 210 can send a notification to the delivery device 234 at the request of the requestor or user, or automatically send the notification upon creation of the label, sending the created label information, or at another time as determined by the central hub 210.

The process 700 moves to block 706, wherein the label generation information is received in the mobile delivery device 234. When the carrier is at a location of a user having the item for pickup, the carrier, using the mobile delivery device 234 scans or reads the created label information sent to the user in block 702. The mobile delivery device 234 can scan or read the created label information and/or the label key from the user's smartphone 236 or computing terminal 232, or from a paper having the label information, label key, or a computer-readable code, thereon. In some embodiments, the carrier can input an alphanumeric code into the mobile delivery device, where the alphanumeric code was provided to the user upon the request for creation of the label. The mobile delivery device can send the inputted alphanumeric code to the central hub 210 to request label generation of the label associated with the alphanumeric code.

When the label information is received, the process moves to decision state 708, wherein it is determined whether the requested label is valid. Determining whether the label is valid in decision state 708 can be similar to the process for determining whether the label is valid in decision state 606 of process 600. In some embodiments, the process of determining whether the label is valid can occur upon scanning the label generation information, via the wireless communication features of the mobile delivery device 234. The mobile delivery device 234 sends the requested label information to the central hub 210, and the central hub determines whether the requested label is valid, as described elsewhere herein. In some embodiments, the carrier receives the item for distribution and places the distribution item in the truck or on a vehicle. The carrier also connects the mobile delivery device to the vehicle, wherein the label generation information is retrieved from the mobile delivery device 234 and communicated to the central hub 210 via a wireless communication mechanism on the carrier's vehicle, wherein the central hub 210 determines whether the requested label is valid, as described elsewhere herein.

If the label is not valid, the process moves to block 710, wherein a message is displayed that the label is not valid. If the label is not valid, a notification can be automatically sent to the user or requestor, for example, to the smartphone 236. In some embodiments, the notification can include a request for additional information, postage, or other information to cure the problem with the label generation information. In some embodiments, the notification can be an invitation to create a new label, and the process of label creation can occur to create a new label.

If the label is determined to be valid, the process 700 moves to block 712, wherein the label is generated. In some embodiments, the carrier may have a mobile printing device, or the mobile delivery device 234 can comprise a printing device for generating the physical labels. When the carrier scans the requested label information and validity of the label is confirmed, the mobile printer or mobile delivery device can automatically, or upon prompt from the carrier, generate the physical label. The carrier or user can affix the label to the item, and the carrier takes the item for delivery.

In some embodiments, the carrier's vehicle can have a printer thereon. Where the mobile delivery device 234 receives confirmation that the requested label is valid, the carrier can take the item to the vehicle. In some embodiments, mobile delivery device 234 can send a command, either automatically or upon a prompt from the carrier, to the printer on the carrier's vehicle to generate the physical label when the mobile delivery device 234 receives notification of the requested label being valid. When the carrier returns to the vehicle from picking up the item, the label is on the printer. In some embodiments, the mobile delivery device 234 is docked in a dock on the vehicle. When the mobile delivery device 234 is docked, the dock, in communication with the vehicle printer, can instruct the vehicle printer to print the physical label.

In some embodiments, a carrier may wish to print the labels for items before the carrier leaves a distribution facility. The carrier can access the central hub 210 via an administrative interface or via the mobile delivery device 234, and request generation of labels that have been previously created by requestors, for items that will be available for pickup along the carrier's route. For example, before leaving for a delivery route, the carrier can request that any labels for items to be picked up along the carrier's route be generated at the distribution facility. The carrier can retrieve the group of labels and take them on the delivery route. As items are picked up, the carrier can attach the appropriate label to the item.

In some embodiments, the central hub 210 can automatically initiate the printing of labels for items to be picked up along a specific route, and can send a notification to the carrier, for example, via the mobile delivery device 234, to pick up the labels for the carrier's delivery route. This can be automated to occur daily at a given time, at a specified interval, or at any other desired time.

The process 700 moves to block 714, wherein the label is affixed to the item. This can be done by the user, such as when the carrier has a mobile printer, or can be done by the carrier. The item is loaded on the vehicle and is transported to a facility in the distribution network for delivery to the intended recipient of the item.

The process 700 then ends in block 716.

Figure 8:
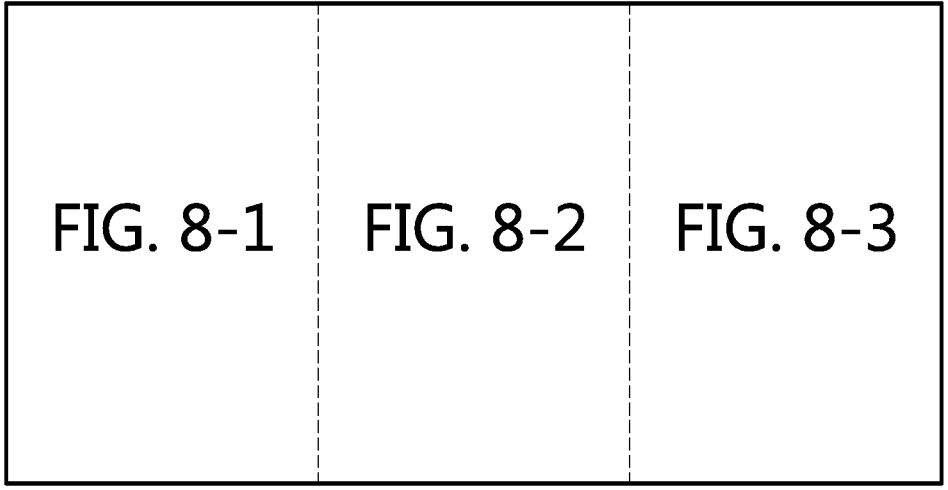
FIG. 8 depicts an arrangement of FIGS. 8-1, 8-2, and 8-3, which depict an exemplary process flow diagram showing data flows between entities in the system of FIGS. 2-1, 2-2, and 2-3.
Figures 1, 8:
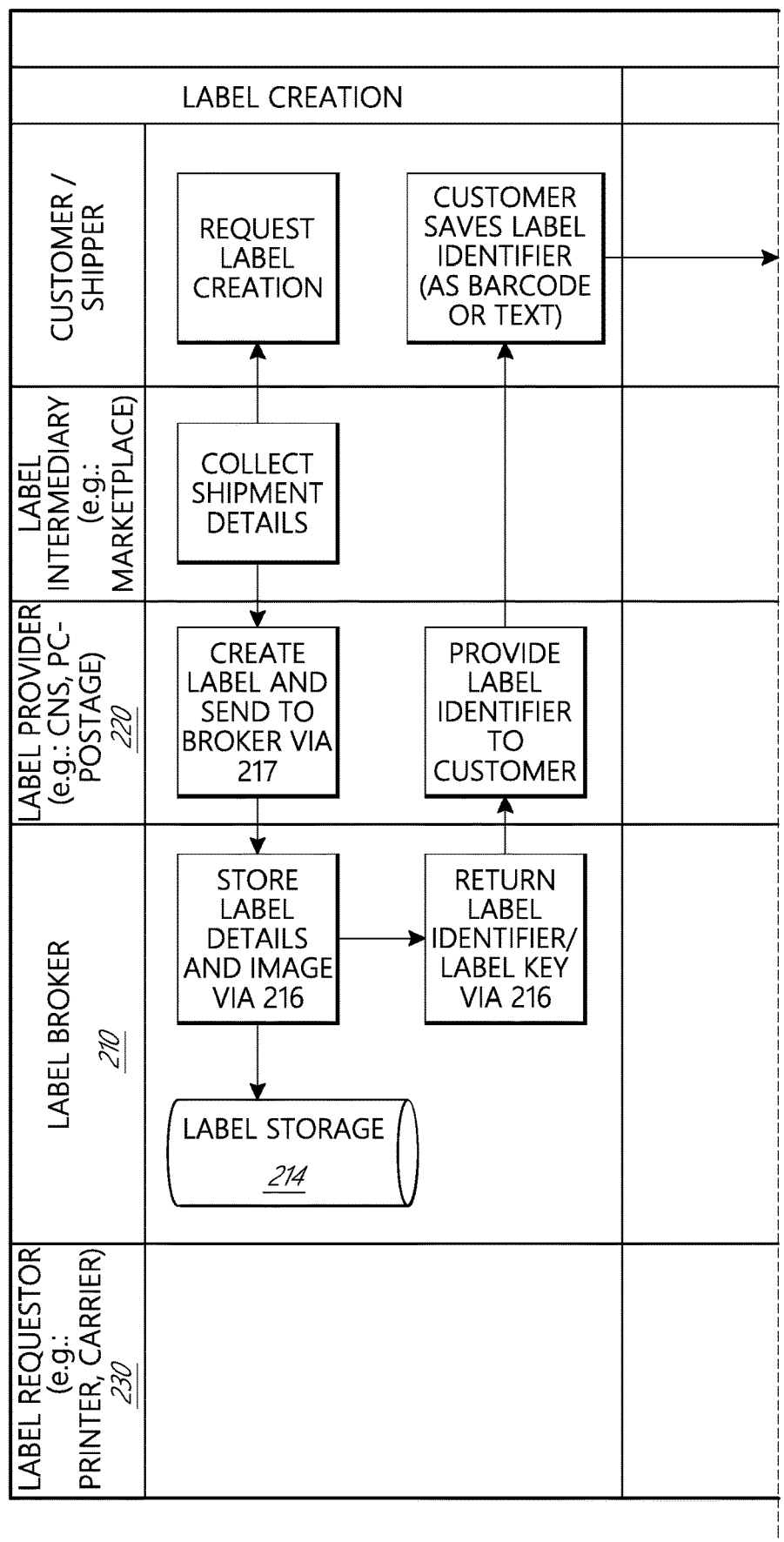
Figures 2, 8:
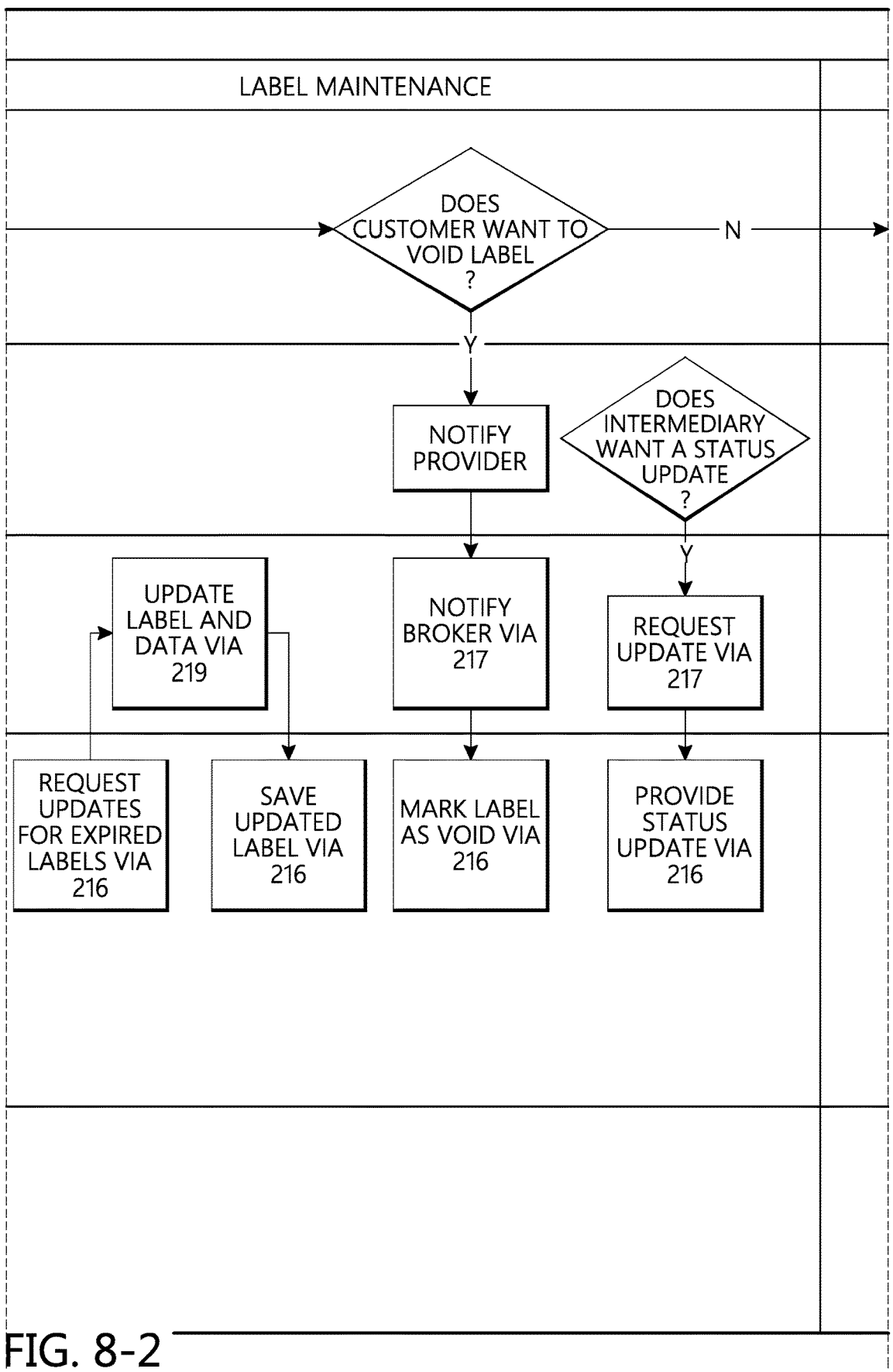
Figures 3, 8:
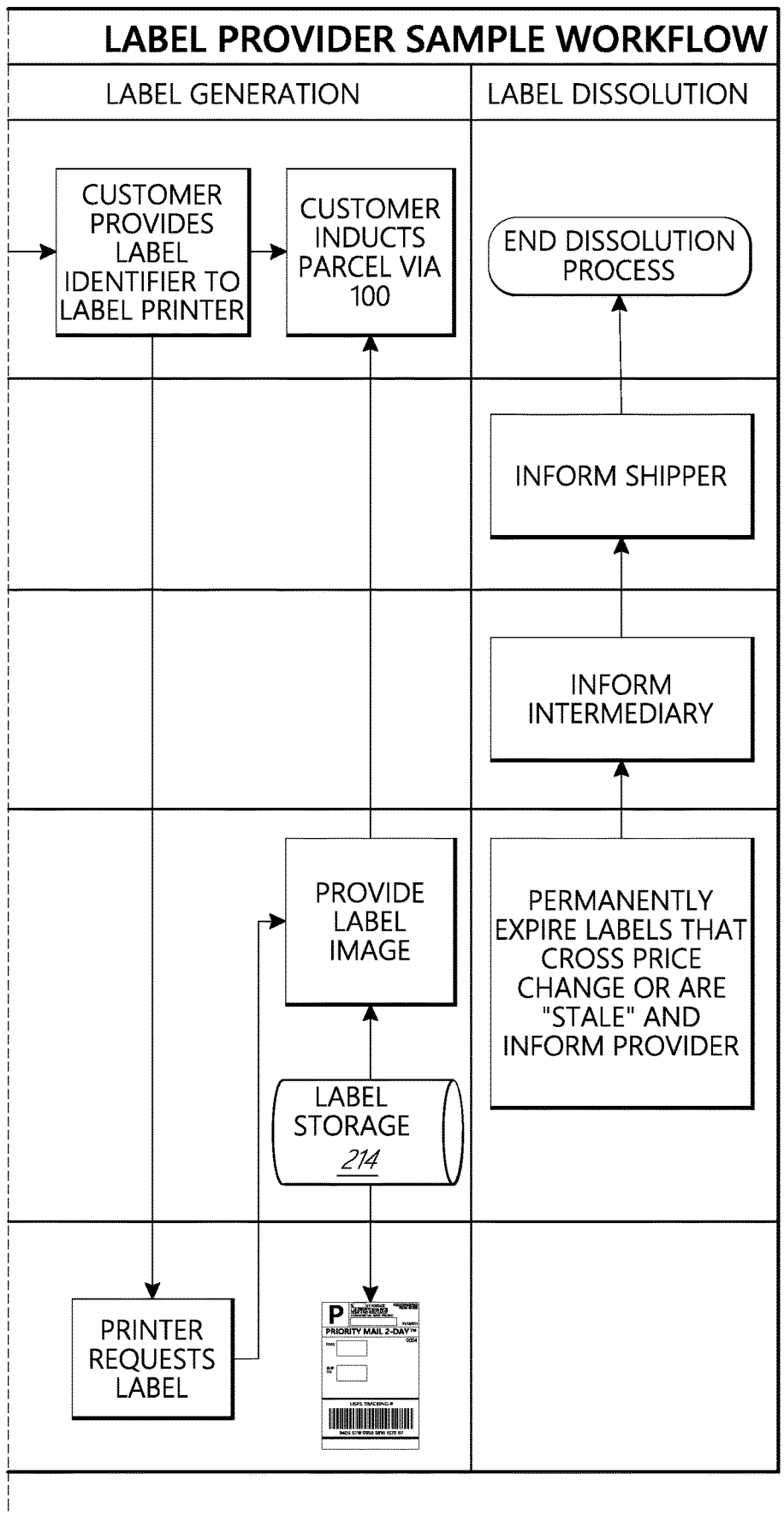

FIG. 8 is an exemplary process flow diagram showing data flows between entities in the system of FIG. 2. FIG. 8 depicts how components of the system 200 interact and how data can flow within the system 200.

Figure 9:
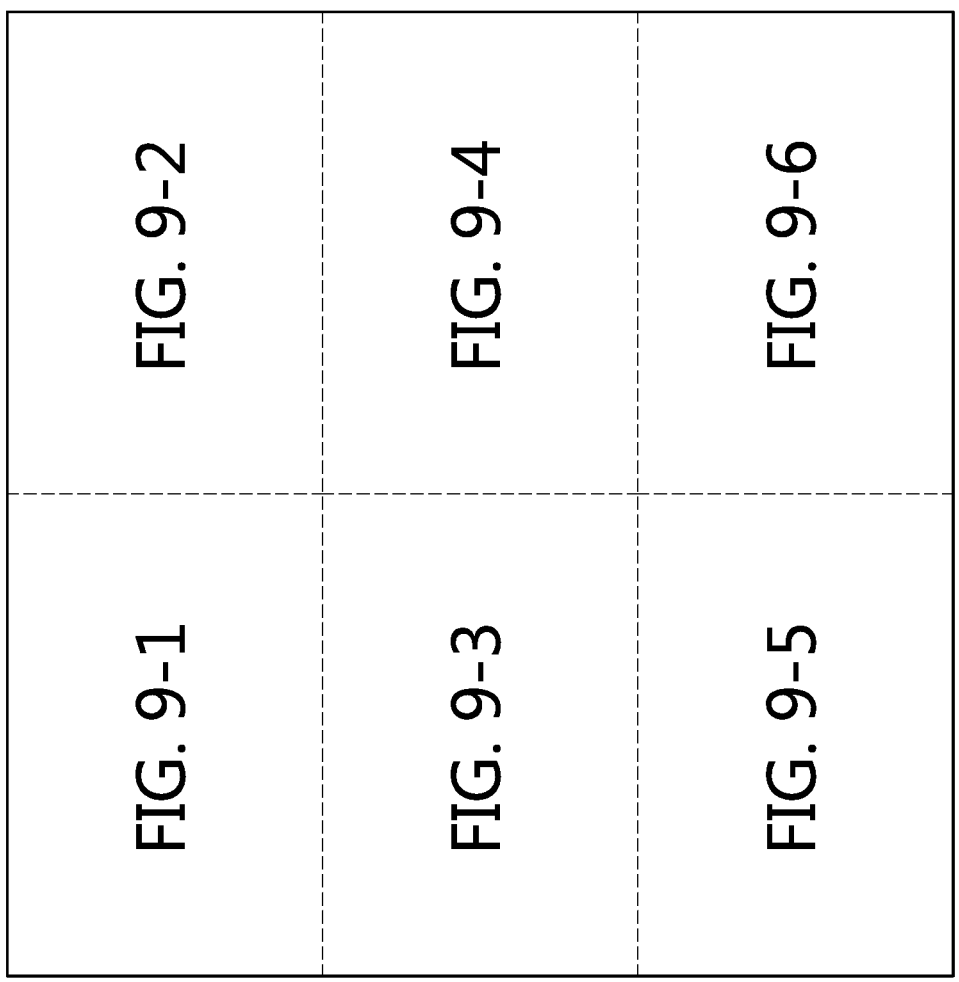
FIG. 9 depicts an arrangement of FIGS. 9-1, 9-2, 9-3, 9-4, 9-5, and 9-6, which depict an exemplary process flow diagram showing data flows between entities for label generation.
Figures 1, 9:
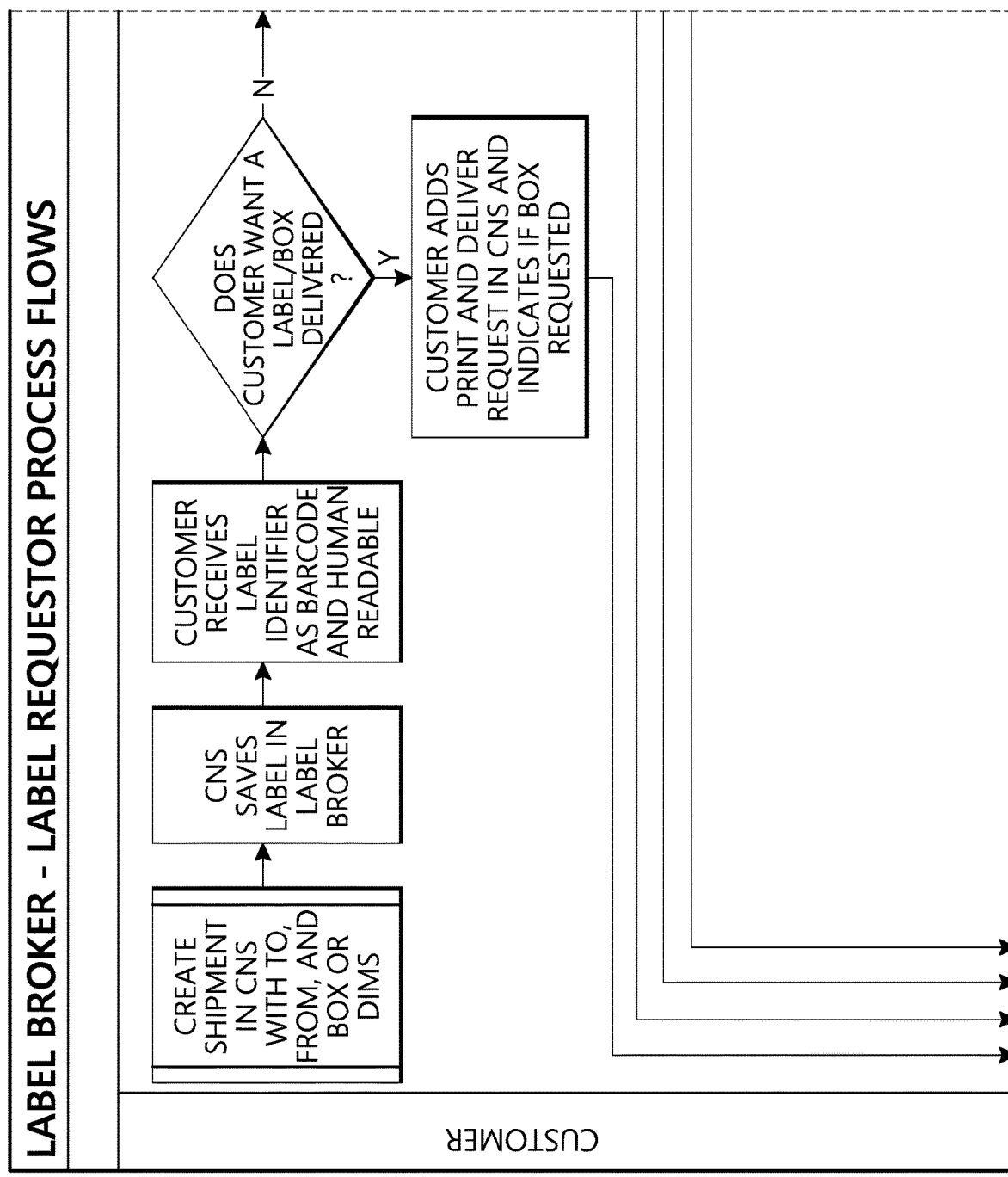
Figures 2, 9:
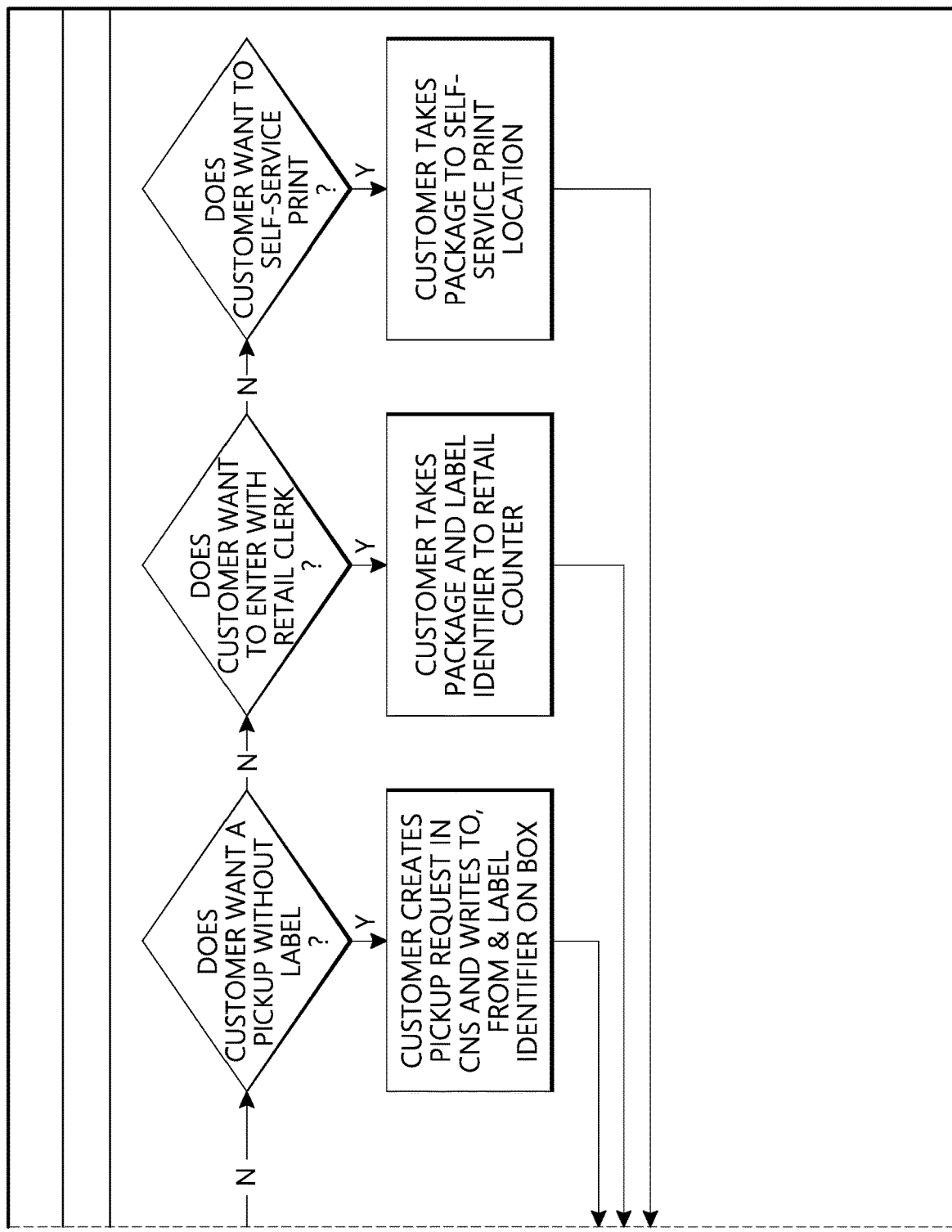
Figures 3, 9:
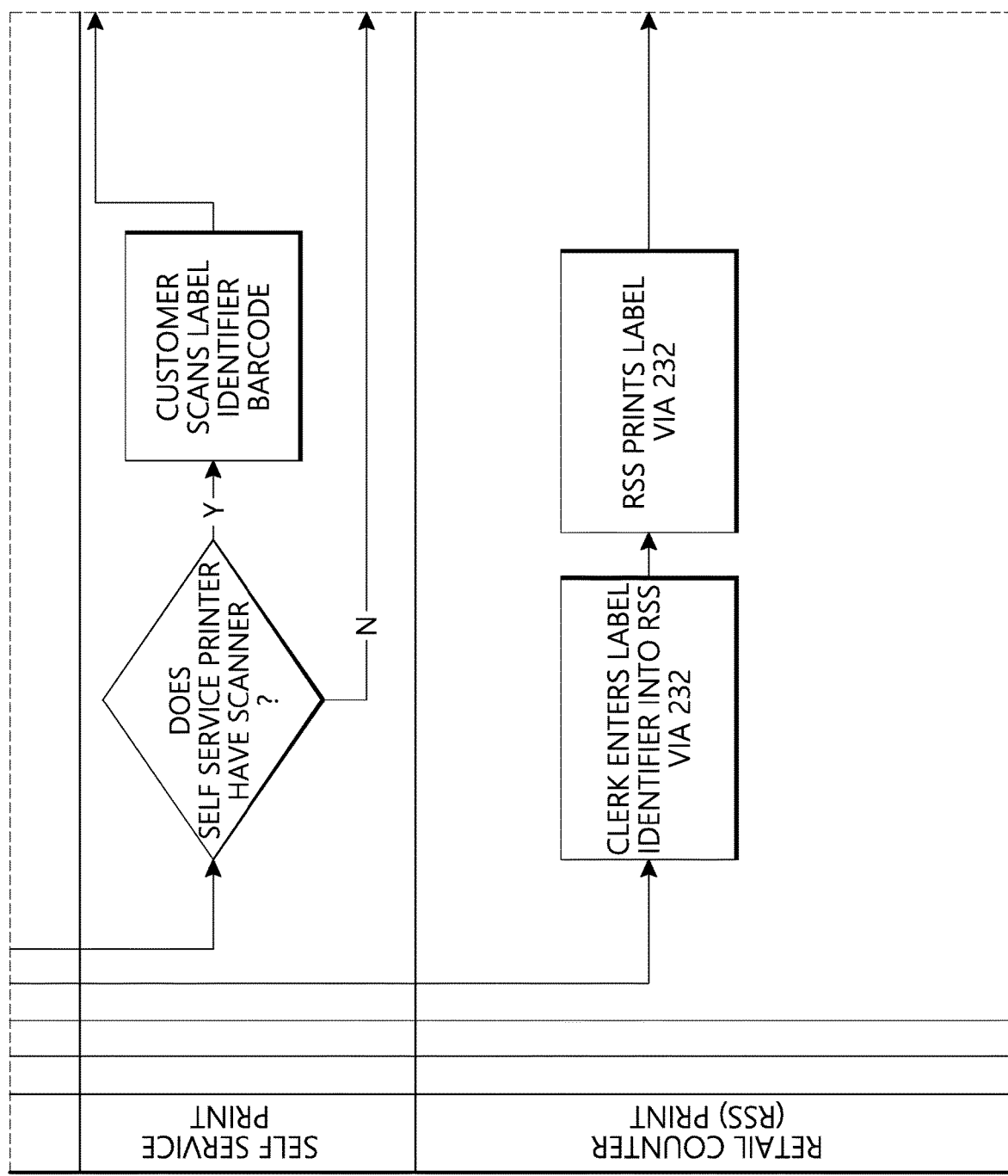
Figures 4, 9:
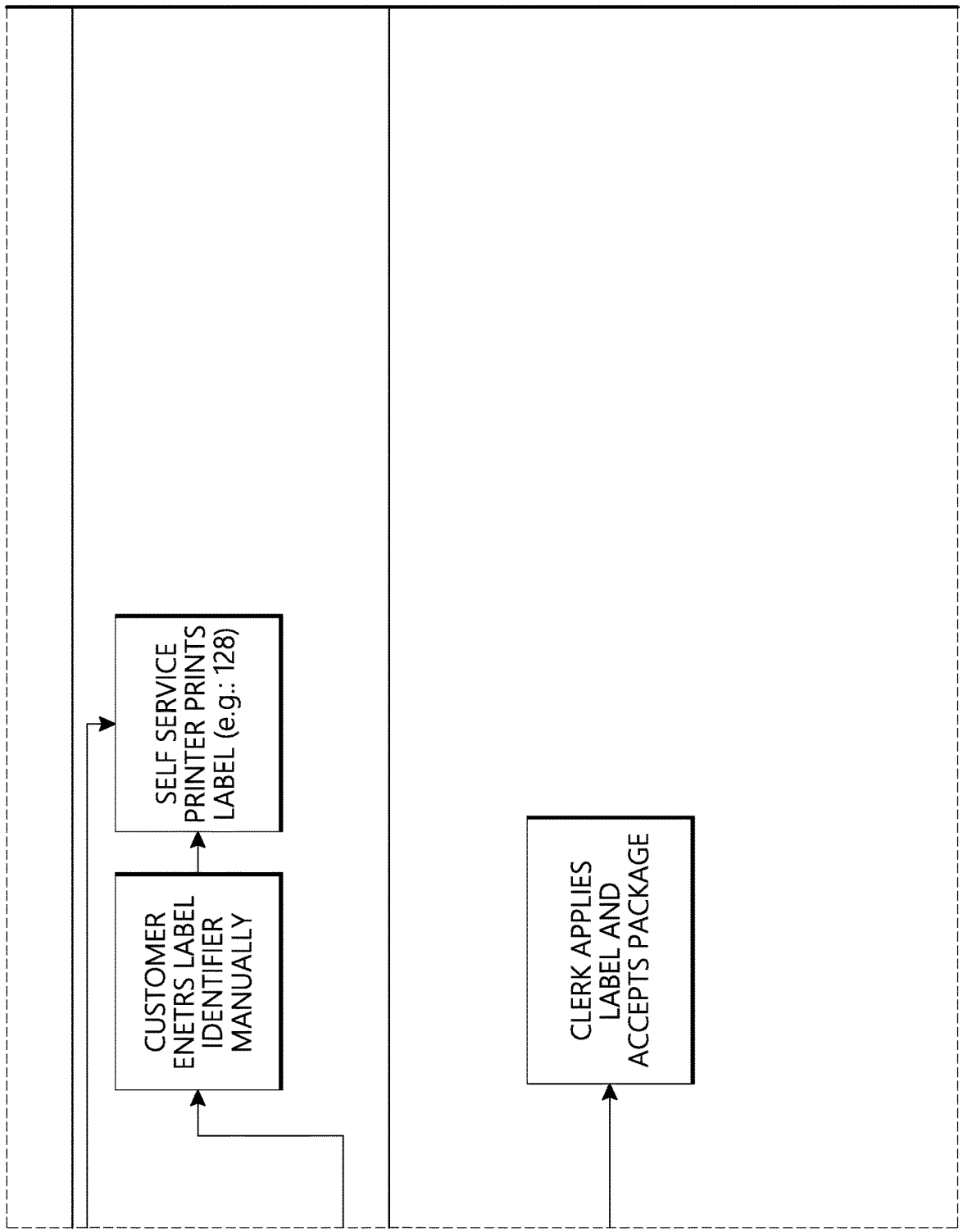
Figures 5, 9:
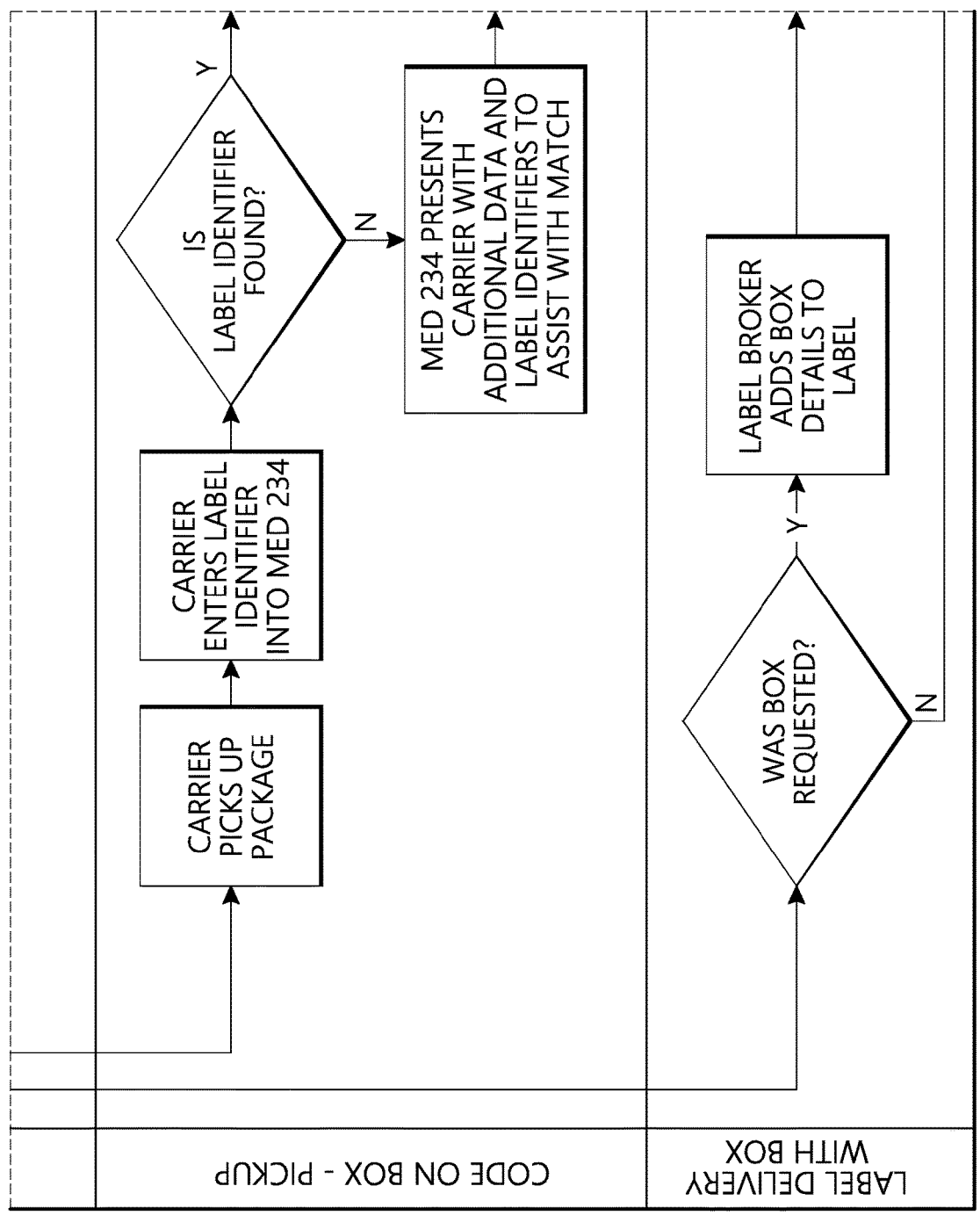
Figures 6, 9:
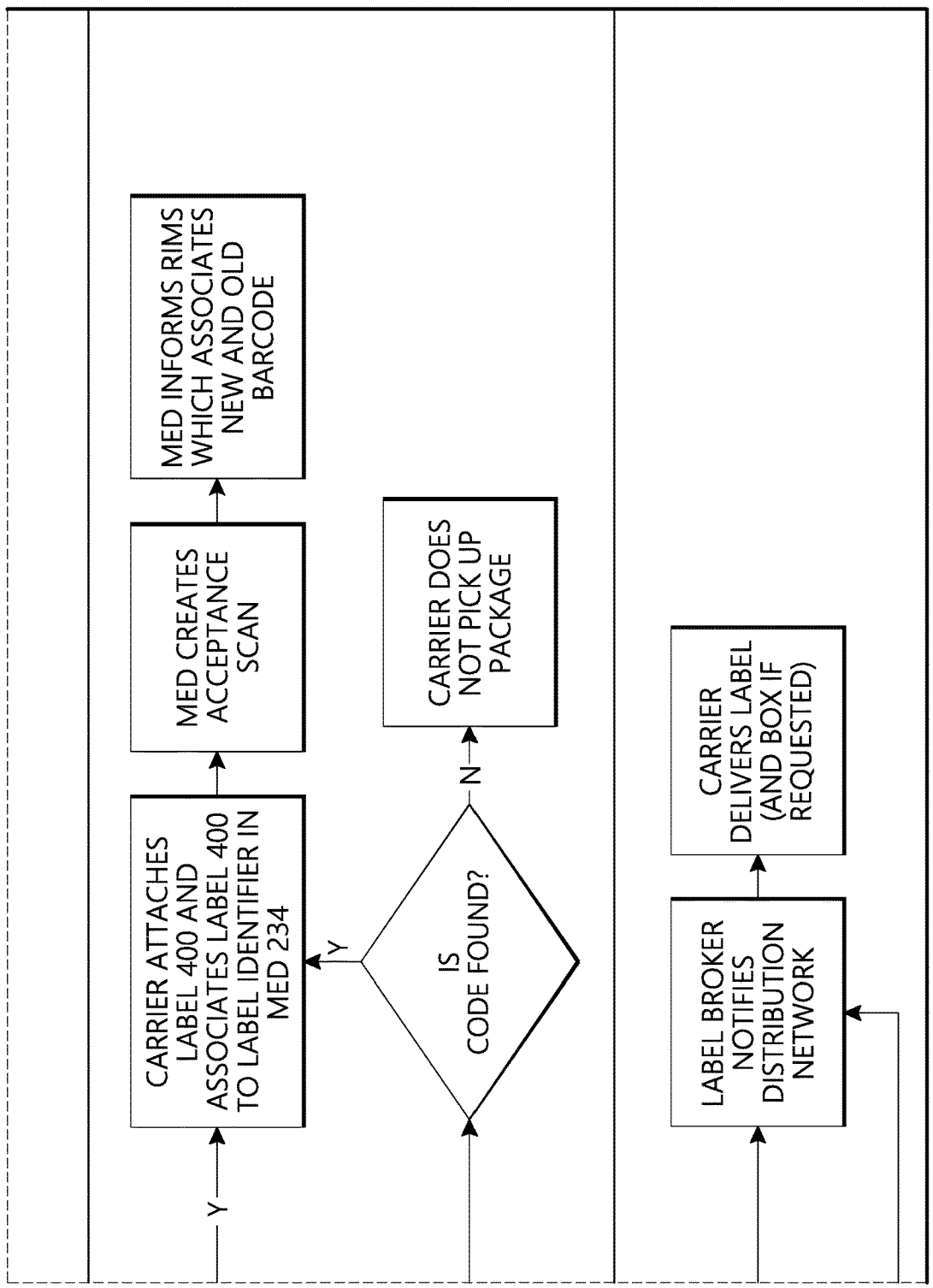

FIG. 9 is an exemplary process flow diagram showing data flows between entities of FIG. 2 for label generation. FIG. 9 depicts alternate or parallel data flows based on a user's chosen mode of label generation. Specifically, FIG. 9 depicts data flows for label information where a user selects to have a label generated at a self-service labeling kiosk, such as at an item receptacle 100, at a retail counter, such as at a USPS facility (which can use a computer terminal 232), label generation by a carrier, such as using the mobile delivery device 234.

Several examples of using the systems and methods described in the present application will now be discussed. One use case includes a shipper, such as a shipper or seller on an auction or seller website, but who does not have or does not wish to print labels at home for shipping can use the system 200. The seller can make a sale in an online marketplace. The seller can then request label creation via a website or application as described herein. Then, the seller, at his or her own convenience can go to the item receptacle 100 and request the label be generated using a code on his or her smartphone 236 and deposit the item in the item receptacle. Or the seller can request the delivery carrier to scan the code and print the label and take the item.

Another example is a shopper who buys an item and wants to send the item to another as a gift. The shopper buys the item and accesses the application via his or her smartphone 236. The shopper creates the label and receives a code for label generation. The application can tell the shopper where the nearest item receptacle 100 using the geo-coordinates of the smartphone 236 to locate the shopper. The application can provide the location of all the item receptacles within a certain radius or distance, or near a zip code or in any other desired location. The application can then provide directions to nearest item receptacle 100, or to a selected item receptacle. The shopper then goes to the item receptacle 100, scans the code, and the item receptacle generates the label, which the shopper attaches to the item. The shopper then deposits the item in the item receptacle 100.

In another example, a user can start a shipment from a home computer using a website or other software application or portal. The user may not have a scale, and so cannot input the weight or pay for postage, etc. The user can request creation of the label via the website, application, or portal. The user then goes to the item receptacle 100 (238), which has a scale. The user scans the code for the label received from the website, and then weighs the item on the scale. The item receptacle determines the weight and then calculates postage. The user can pay the postage at the item receptacle 100 or can have the amount debited or charged to a credit card associated with the user's account. The label is then generated, and the user attaches the label to the item and deposits the item in the item receptacle.

The following tables show some of the features and functionality of the system 200 and communication between components of the system 200.

TABLE 1

THEME: Access Control

| AS A... | I WANT TO... | SO THAT... |
|---|---|---|
| Admin | Define authorized label providers | Access is restricted to known, authorized users |
| Admin | Define authorized label requestors | Access is restricted to known, authorized users |
| Admin | Store credentials to send requests to label providers | Outbound requests will be accepted |
| Label Broker | Only allow labels to be provided from authorized label providers with an authorized user id and password. | Security is maintained avoid attacks and preventing fraud |
| Label Broker | Only allow labels to be requested from authorized label requestors as using user id and password | Security is maintained avoid attacks and preventing fraud |
| Label Broker | Use customer registration for user id and password credentials. | Customer registration is the single source for access control |
| Label Broker | Store an audit log of requests (inbound and outbound) including the following data: date and time; requesting user id; label provider, request made, label identifier, success or failure, and if a failure, the reason code | The admin can audit any changes to labels |

TABLE 2

THEME: General Administration

| AS A... | I WANT TO... | SO THAT... |
|---|---|---|
| Admin | Store a source identifier, which, when included in a key will identify the label provider | The provider can be identified from the key alone |
| Admin | Define a number of days at which labels will permanently expire | The label broker will not have to keep labels forever |
| Admin | Define the date of any price change and the mail classes affected | The label broker will not print a label which could potentially be short paid |
| Admin | Set date and time "triggers" to run the batch processes (defined below) | Batch process defined below can be run automatically |
| Admin | Be able to manually start batch processes | The system can recover from outages which may have prevented batch processes from running |

TABLE 3

THEME: Store a new label

| AS A... | I WANT TO... | SO THAT... |
|---|---|---|
| Label Provider | Send data, that is a description of the elements that make up a label such as mail class, delivery address, etc., to the label broker | The label provider will have label details in a format that can be queried, tested and reported |
| Label Provider | Send an image of the label to the label broker | The image can be printed |
| Label Provider | Receive confirmation that the label data and image were successfully stored or a reason code indicating why it wasn't | The label provider can resolve any issues to provide a new label |
| Label Provider | Receive a unique label identifier that will uniquely identify a label's data and image | The label can be referenced by that identifier for update, void, reporting, etc. |

TABLE 3-continued

THEME: Store a new label

| AS A . . . | I WANT TO . . . | SO THAT . . . |
|---|---|---|
| Label Broker | Validate required elements are provided in the label data such as ship data, mail class, and any other elements identified as required by other stories | The validations defined in subsequent stories may be properly processed |
| Label Broker | Validate label ship date to be within a range from today's date to either its permanent expiry date or a price change for the label's mail class | Expired labels, labels too far in the future or labels that cross a price change will not be accepted |
| Label Broker | Create a unique label identifier to identify the new label | So that labels can be uniquely identified for printing, update, reporting, etc. |
| Label Broker | Store a label which passes validations in available status | The label is available for printing |
| Label Broker | Inform the label provider of a success or failure and provide the label identifier | The label provider can act accordingly |

TABLE 4

THEME: Void a label

| AS A . . . | I WANT TO . . . | SO THAT . . . |
|---|---|---|
| Label Provider | Request that a label be made unavailable for print | Labels which have been voided or for which a refund has been requested cannot be printed |
| Label Broker | Validate that the label identifier exists | To determine if an error has occurred |
| Label Broker | Validate that the label identifier belongs to the requesting label provider | Labels can only be voided by the original requestor |
| Label Broker | Validate that the label identifier has not already been printed | Printed labels cannot be voided |
| Label Broker | Mark the label as voided | The label cannot be printed |
| Label Broker | Inform the label provider of a success or failure | The label provider can act accordingly |

TABLE 5

THEME: Request label status

| AS A . . . | I WANT TO . . . | SO THAT... |
|---|---|---|
| Label Provider | Request the status of a label | Label intermediaries such as marketplaces can be informed |
| Label Broker | Validate that the label identifier belongs to the requesting label provider | Labels status is only shared with the original requestor |
| Label Broker | Inform the requestor of label status or request failure | The label provider can act accordingly |

TABLE 6

THEME: Update a label

| AS A . . . | I WANT TO . . . | SO THAT . . . |
|---|---|---|
| Label Provider | Provide new label data and a new image to update a label | Label ship dates can be changed |
| Label Broker | Insure the label is not in "Printed," "Voided" or "Permanently Expired" status | Only valid labels are updated |
| Label Broker | Validate that the label identifier belongs to the requesting label provider | Labels can only be voided by the original requestor |
| Label Broker | Validate required elements are provided in the label data such as ship data, mail class, and any other elements identified as required by other stories | The validations defined in subsequent stories may be properly processed |
| Label Broker | Validate label ship date to be within a range from today's date to either its permanent expiry date or a price change for the label's mail class | Expired labels, labels too far in the future or labels that cross a price change will not be updated |
| Label Broker | Store the new label data and image | The updated label is now available for printing |
| Label Broker | Inform the requestor of label status or request failure | The label provider can act accordingly |

TABLE 7

THEME: Print a label

| AS A . . . | I WANT TO . . . | SO THAT . . . |
|---|---|---|
| Label Requestor | Request a label by label identifier | The label can be printed for the user |
| Label Broker | Provide the label image to the printer if the label identifier exists in either Available or Printed status | The requestor can print the label |
| Label Broker | Provide a reason code to the requestor if the label does not exist or exists in a non-printable status | So the requestor can inform the user |
| Label Requestor | Inform the label broker of a successful print or print failure | So the status can be updated |
| Label Broker | Update the label to Printed status when the print is successful | So the status reflects the current state |
| Label Broker | Update the label to Print Failure status when the print is unsuccessful | So the status reflects the current state |
| Label Broker | Send a print notification (success or failure) to the label provider | The label provider can act accordingly |

TABLE 8

THEME: Reporting

| AS A . . . | I WANT TO . . . | SO THAT . . . |
|---|---|---|
| Admin | Be able to query number of labels by status | A snapshot of the system usage is available |
| Admin | Be able to view request log | Problem diagnosis can be performed |
| Admin | Be able to view status for a particular label identifier | An individual label printing problem can be diagnosed |
| Admin | Be able to query request history by any parameter or combination of parameters in the request log (e.g.: all requests for a certain date or all requests from a particular user on a certain date) | Problem diagnosis can be performed |
| Admin | Be able to view available storage and any storage alerts (storage greater than threshold) | Capacity planning can be performed |
| Admin | Be able to view current (latest) response time by request and response time history | Problem diagnosis can be performed |

TABLE 9

THEME: Batch Process to automatically expire labels

| AS A . . . | I WANT TO . . . | SO THAT . . . |
|---|---|---|
| Label Broker | Mark labels in Available status who's ship date is more than the permanent expiry number of days prior to today's date as "Permanently Expired" | Labels are not stored as available indefinitely |
| Label Broker | Mark Available labels "Permanently Expired" if today = a price change and their mail class is affected. | Labels that may have incorrect postage due to the price change are not available for printing |
| Label Broker | Mark Available labels who's original ship date is less than the permanent expiry number of days prior to today's date as "Expired" | Users cannot print labels where the ship date on the label is not current |
| Label Broker | Inform the label provider with an outbound call of status changes | The label provider has the option to send a label with a current date |

The labelling and induction features described herein allow the shifting of the time and the location of label generation from the time and location of requesting the label. This can be useful to allow a requested label to be physically produced at a variety of locations and, in some instances, by a party that did not directly request the label such as a postal carrier.

In some embodiments, the user may provide an identifier at a retail location. The identifier may be provided through a physical medium (e.g., printed paper) or through a digital medium (e.g., scannable code displayed on a smartphone, NFC communications, etc.) which can be input at the retail location. A retail clerk may scan the barcode or key in the human readable code and provide the user with a physical label. If the user has their package with them it can be tendered immediately along with an acceptance scan and receipt. The retail systems may include features (e.g., interfaces) to accept a label ID by either scanning a code or manually entering the ID. The retail system may then transmit a request for the label to the central hub who may, in turn, provide the label. If the label is found and available for printing the retail system may activate a printer to produce a physical label. Once successfully produced, the retail system may call the central hub to update the label status to printed.

In some embodiments, the user may request at home labeled induction of an item. For example, a label provider or distribution network provider associated with the label (e.g., USPS) may include an option for at home labeling when creating a label or after label creation if the label status is not "printed" or "expired." The label may be delivered to the user with their regular mail delivery on the next business day or the business day of their choosing. In some implementations, the user may request at home label delivery by scheduling a package pickup. The labels for the scheduled date may be preprinted and provided to a delivery agent responsible delivery to the user's location. In some implementations, the labels may be stored on a handheld communication device associated with the delivery agent. In such implementations the handheld device may communicate with a mobile printer to produce the physical label. As discussed, the printing may be based on proximity of the handheld device to a location which requested at home label delivery.

In some implementations, a third-party may request the label on behalf of a user. For example, if a retailer wishes to provide shipping for an item to be returned by a user, the retailer may request the label and provide the label ID to the user who is returning the item. In such instances, the user may print the label at a retail location or induction kiosk by presenting the label ID. In some instances, the user may wish to print the label on a personal printer. An interface may be provided to receive the label ID and initiate production of the physical label.

Figure 10:
FIG. 10 is an example interface for requesting production of a physical label.

FIG. 10 is an example interface for requesting production of a physical label. The interface 1000 may be a graphical user interface presented on a communication device of the user or at a self-service kiosk, an induction unit, or other induction communication device. The interface 1000 includes input elements to receive the label ID and other information to confirm the label (e.g., return address ZIP code). The interface 1000 also includes selection element to allow the user to select which form of label induction to use. As shown in FIG. 10, the user may select to print or download in two different formats or request an at home label delivery. The interface 1000 may include additional input elements to collect information corresponding to a selected induction method (e.g., name, street address, and delivery date for at home label delivery).

Embodiments may include one or more of the following features to facilitate labeled induction. While the embodiments are described as network-based service calls, it will be appreciated that alternate embodiments such as thick-client applications or purpose built communication devices may be used.

To provide security, the system 200 may require 2-way mutual secure socket layer (SSL) authentication. For example, users may be required to have an SSL client-id certificate that is issued by a certificate authority. Authorized users may also be required to have their certificates pre-registered with the system.

A label provider (e.g., label broker) may need to satisfy one or more requirements prior to making use of the network-based services offered through the system. One requirement may be registration of an SSL certificate. Registration may include obtaining a valid SSL client certificate issued by the certificate authority and registration of the subject common name (CN) of the certificate within the system. Any change in the subject CN may result in an unrecognized certificate. Another requirement may be certification of the label provider. The certification may be an automated, manual, or hybrid process by which the label provider is assessed for compliance with the communications for requesting and managing labels. After completion of the certification process a provider may have access to the system for labeled item induction.

The labeled item induction may include a variety of steps to store a new label, request status for one or more labels, change or validate status of a label, etc.

A store label service may allow providers to save a label image and the associated label data under a unique label ID. The label ID is the unique identifier of a label within the label provider, and can be used in later label status and print requests. Label IDs may have the potential of being reused after its associated label is permanently expired and/or purged—no earlier than 3 years after the physical label creation date. Table 10 provides example request information that may be received from a label provider by the central hub 210. Some values may be limited to an enumerated set of valid values. The enumerations may correspond to existing standards such as the US Postal Service's Shipping Services File Record Version 1.6 Layout (SSF v1.6) which is hereby incorporated by reference in its entirety.

TABLE 10

| Fields | Data Format | Length | Required | Details | Corresponding Shipping Services File (SSF) field |
| --- | --- | --- | --- | --- | --- |
| paymentType | Numeric | 2 | Y | Code for an acceptable payment type such as those identified in SSF v1.6 | SSF: Method of Payment |
| mailClass | Alphanumeric | 2 | Y | Code for mail class such as those identified in SSF v1.6 | SSF: Class of Mail |
| accountNumber | Alphanumeric | <=20 | Y | Numbers 0-9 allowed Ex. 0123456789 | SSF: Payment Account Number (paymentType = 01, 03) SSF: Meter Serial Number (paymentType = 04, 05, 06) |
| accountZipCode | Numeric | 5 | Y | Numbers 0-9 allowed Ex. 01234 | SSF: Post Office ZIP Code |
| shipDate | Numeric | 8 | Y | Format: YYYYMMDD Ship Date must be current or future date. Future date must not exceed max allowable ship date. | SSF: Date of Mailing |
| trackingNumber | Numeric | <=34 | Y | aka IMpb Numbers 0-9 allowed | SSF: Tracking Number |

TABLE 10-continued

| Fields | Data Format | Length | Required | Details | Corresponding Shipping Services File (SSF) field |
|---|---|---|---|---|---|
| recipientName | Alphanumeric | <=48 | N | If input exceeds length limit, it will be truncated and then saved | SSF: Recipient Name |
| recipientAddress1 | Alphanumeric | <=48 | N | Inputs exceeding length limit, it will be truncated and then saved | SSF: Destination Delivery Address |
| recipientAddress2 | Alphanumeric | <=48 | N | If input exceeds length li (e.g., mit, it will be truncated and then saved | SSF: Destination Delivery Address |
| recipientCity | Alphanumeric | <=48 | N | If input exceeds length limit, it will be truncated and then saved | SSF: Destination City |
| recipientState | Alphanumeric | 2 | N | Must be a valid state abbreviation | SSF: Destination State |
| recipientZip | Alphanumeric | 5 | Y | | SSF: Destination ZIP Code |
| recipientZip4 | Alphanumeric | 4 | N | | SSF: Destination ZIP + 4 |
| senderName | Alphanumeric | <=48 | N | If input exceeds length limit, it will be truncated and then saved | SSF: Sender Name |
| senderAddress1 | Alphanumeric | <=48 | N | If input exceeds length limit, it will be truncated and then saved | SSF: Return Address |
| senderAddress2 | Alphanumeric | <=48 | N | If input exceeds length limit, it will be truncated and then saved | SSF: Return Address |
| senderCity | Alphanumeric | <=48 | N | If input exceeds length limit, it will be truncated and then saved | SSF: Return Address City |
| senderState | Alphanumeric | 2 | N | Must be a valid state abbreviation | SSF: Return Address State |
| senderZip | Numeric | 5 | N | Numbers 0-9 allowed Ex. 01234 | SSF: Return Address ZIP Code |
| senderZip4 | Numeric | 4 | N | | SSF: Return Address ZIP Code + 4 |
| masterMid | Alphanumeric | 6 or 9 | Y | | SSF: Mailer ID |
| serviceTypeCode | Alphanumeric | 3 | Y | Code specifying a service type such as those identified in SSF v1.6 | SSF: Service Type Code |
| merchantId | Alphanumeric | <=30 | N | | SSF: Customer Reference Number 1 |
| entryFacilityZipCode | Numeric | 5 | Y | | SSF: Entry Facility ZIP Code |
| weight | Numeric | 7 | N | Format: NN.NNNN (in lbs.) Range: 0-99.9999 | SSF: Weight |
| length | Numeric | 6 | N | Format: NNN.NN (inches) Range: 0-999.99 | SSF: Length |

TABLE 10-continued

| Fields | Data Format | Length | Required | Details | Corresponding Shipping Services File (SSF) field |
|---|---|---|---|---|---|
| width | Numeric | 6 | N | Format: NNN.NN (inches) Range: 0-999.99 | SSF: Width |
| height | Numeric | 6 | N | Format: NNN.NN (inches) Range: 0-999.99 | SSF: Height |
| processingCategory | Alphanumeric | 2 | N | Code specifying a processing category such as those identified in SSF v1.6 | SSF: Processing Category |
| rateIndicator | Alphanumeric | 2 | N | Code specifying a rate indicator such as those identified in SSF v1.6 | SSF: Rate Indicator |
| fileExtension | Alphanumeric | 3 or 4 | Y | Label image file extension (e.g., PDF, JPG, GIF, PNG, etc.) | |
| labelImageBase64 | Alphanumeric | | Y | Image file as base64 encoded string | |

The central hub 210 may provide a response to the request indicating the status of the label creation request. Table 11 provides example response information that may be transmitted from the central hub 210 to the label provider system 220r.

TABLE 11

| Name | Data Format | Required | Length | Details |
|---|---|---|---|---|
| methodName | String | Y | 19 | e.g. "StoreLabelResponse" |
| labelDataId | String | Y | 10 | The Unique ID of the Label |
| labelStatus | String | Y | 9 | See list of acceptable Label Status Codes |
| responseCode | Numeric | Y | 4 | See list of Response Codes |
| responseMessage | String | N | 27 | If the value in the responseCode field <> 200 (i.e., the request failed), then this field will be replaced with the validationErrors field |
| validationMessages | List <ValidationMessages> | N | Dependent on returned validation messages | Contains a list of validation messages, each of which contains the response code, response type (warning or error), and detail message. It is possible to receive a Successful response with Warning messages for minor validation issues with the input parameters. The request will be processed and saved. However, any Error messages will result in rejection of the Request, and a Failure response will be returned. The request will not be processed and not saved. |

The central hub may provide status services to allow providers to request the status of one or more labels. Status for a single label status may be requested by providing its unique label ID. The label ID may be an alphanumeric string of a predetermined size or range of sizes (e.g., 8-10 characters). Table 11 provides example response information that may be transmitted from the central hub 210 to the label provider system 220 for a status request.

TABLE 12

| Name | Data Format | Required? | Length | Details |
| --- | --- | --- | --- | --- |
| MethodName | String | Y | 18 | "RequestLabelStatusResponse" |
| ResponseCode | Numeric | Y | 4 | See list of Response Status Codes |
| ResponseMessage | String | Y | | SUCCESS or FAILURE |
| systemLogId | Numeric | Y | | Unique identifier associate to this specific API call |
| ValidationMessages | List <ValidationMessage> | N | Dependent on the validationMessages returned | If the Response Code is 200 (success), then this will be omitted. If the RequestStatus is not 200 (i.e., the request failed), then this will be populated. Contains a list of validation messages, each of which contains the response code, response type (warning or error), and detail message. |
| labelAttributes | List <LabelAttributes> | N | | Returns a sub object containing LabelId and labelStatus |
| LabelId | Alphanumeric | Y | 8-10 | The Unique ID of the Label |
| LabelStatus | String | Y | 7 | Label's status |

In some implementations, it may be desirable to reduce the amount of network communications needed to request status for multiple labels. One way to improve the efficiency of status requesting for multiple labels is to provide bulk status request service. The bulk status request service allows label providers to request the status of multiple labels based on their ship date values. The request may include a two ship date values identifying the range of days for which label status will be provided. To minimize the impact on the central hub 210, the bulk interface may limit the range to a predetermined number of days (e.g., 10 days). Table 13 provides example response information that may be transmitted from the central hub 210 to the label provider system 220 for a status request.

TABLE 13

| Name | Data Format | Required? | Length | Details |
| --- | --- | --- | --- | --- |
| MethodName | String | Y | 18 | "BulkRequestLabelStatusResponse" |
| ResponseCode | Numeric | Y | 4 | See list of Response Status Codes |
| ResponseMessage | String | Y | | SUCCESS or FAILURE |
| systemLogId | Numeric | Y | | Unique identifier associate to this specific API call |
| ValidationMessages | List<ValidationMessage> | N | Dependent on the validationMessages returned | If the Response Code is 200 (success), then this will be omitted. If the RequestStatus is not 200 (i.e., the request failed), then this will be populated. Contains a list of validation messages, each of which contains the response code, response type (warning or error), and detail message. |
| labelAttributes | List <LabelAttributes> | N | | Returns a sub object containing LabelId and labelStatus for each label within the requested range. |
| LabelId | Alphanumeric | Y | 8-10 | The Unique ID of the Label |
| LabelStatus | String | Y | 7 | Label's status |

The central hub 210 may include a void label service to allow providers to void a single label by providing its unique label ID. The central hub may update a disposition status for the specified label and provide a response to the label provider system requesting the voiding. Examples of information that may be included in a response to the label provider system 220 from the central hub 210 to void a label are shown in Table 14.

TABLE 14

| Name | Data Format | Required? | Length | Details |
| --- | --- | --- | --- | --- |
| MethodName | String | Y | 18 | "RequestLabelStatusResponse" |
| LabelId | Alphanumeric | Y | 8-10 | The Unique ID of the Label |
| LabelStatus | String | Y | 7 | Label's status |

TABLE 14-continued

| Name | Data Format | Required? | Length | Details |
|---|---|---|---|---|
| ResponseCode | Numeric | Y | 4 | See list of Response Status Codes |
| ResponseMessage | String | Y | | SUCCESS or FAILURE |
| systemLogId | Numeric | Y | | Unique identifier associate to this specific API call |
| ValidationMessages | List<ValidationMessage> | N | Dependent on the validationMessages returned | If the Response Code is 200 (success), then this will be omitted. If the RequestStatus is not 200 (i.e., the request failed), then this will be populated. Contains a list of validation messages, each of which contains the response code, response type (warning or error), and detail message. |

The central hub 210 may include an update label service which allows label providers to update the ship date of a label by providing the label ID of the label they want to update. The label ID is the unique identifier of a label within the system, and can be used in later label status and print requests. Upon receipt, the central hub 210 may update a record stored in the memory 214 associated with the label ID. Table 15 includes examples of information that may be included in an update request.

TABLE 15

| Fields | Data Format | Length | Required | Details | Corresponding SSF |
|---|---|---|---|---|---|
| LabelId | Alphanumeric | 8-10 | Y | The unique ID of the label - must correspond to a valid ID in the system. | labelId |
| shipDate | Numeric | 8 | Y | Format: YYYYMMDD Ship Date must be current or future date. Future date must not exceed max allowable ship date. | SSF: Date of Mailing |
| fileExtension | Alphanumeric | 3 or 4 | Y | Label image file extension (e.g., PDF, JPG, GIF, PNG, etc.) | |
| labelImageBase64 | Alphanumeric | | Y | Image file as base64 encoded string | |

Table 16 includes examples of information that may be included in a response message from the central hub 210 for an update request such as from a label provider system 220.

TABLE 16

| Name | Data Format | Required | Length | Details |
|---|---|---|---|---|
| methodName | String | Y | 19 | e.g. "UpdateLabelResponse" |
| labelDataId | String | Y | 10 | The Unique ID of the Label |
| labelStatus | String | Y | 9 | See list of acceptable Label Status Codes |
| responseCode | Numeric | Y | 4 | See list of Response Codes |
| responseMessage | String | N | 27 | If the value in the responseCode field <> 200 (i.e., the request failed), then this field will be replaced with the validationErrors field |

TABLE 16-continued

| Name | Data Format | Required | Length | Details |
|---|---|---|---|---|
| systemLogId | Numeric | Y | | Unique identifier associate to this specific API call |
| validationMessages | List<Validation Messages> | N | Dependent on returned validation messages | Contains a list of validation messages, each of which contains the response code, response type (error), and detail message. Any Error messages will result in rejection of the Request, and a Failure response will be returned. The request will not be processed. |

In Tables 11-16, reference may be made to label status codes. The label status code indicates the disposition status of a given label associated with an item. Table 17 provides examples of label status codes which may be included in the system.

TABLE 17

| Label Status Code | Description |
|---|---|
| AVAILABLE | Label is active and ready for print |
| PRINTED | Label has been printed successfully |
| PRINT_REQUESTED | Label has been requested for printing |
| PRINT_FAILED | Label was unable to be printed |
| VOIDED | Label has been voided |
| EXPIRED | Label has expired (correction to Ship Date can return the Label ID to Available status) |
| PERMANENTLY_EXPIRED | Label has permanently expired (the Label can no longer be updated) |

In Tables 10-16, reference may be made to response status codes. A response status code may correspond to a predefined identifier that is associated with a particular response to a request. A code may be associated with a message type (e.g., error, warning, info), a status message (e.g., success, failure, invalid label ID, missing input value, invalid input value, etc.) and a textual description of the status. When providing status, the code may be used to minimize the data transferred between the central hub 210 and label provider 220. A look up table or other data structure may store a mapping between the response status codes and the messages and description. The look up table may be implemented as a service which can be queried using the request status code to obtain information about the request status code such as message type, status message, or textual description.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

The technology is operational with numerous other general purpose or special purpose computing system environments or configurations. Examples of well-known computing systems, environments, and/or configurations that may be suitable for use with the invention include, but are not limited to, personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 210 may comprise a processor 212 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processors 212 and 305 typically have conventional address lines, conventional data lines, and one or more conventional control lines.

The system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer-readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

What is claimed is:

1. A system for labeled induction of an item into a distribution network, the system comprising:
  a label provider configured to:
    receive, from a sender communication device, a request for a label to distribute an item via a distribution network, the request for the label including a sender address identifying a location from which the item is being distributed;
    create a label based on the request for the label; and
    transmit, to a distribution server, the created label for the item; and
  the distribution server in communication with the label provider, wherein the distribution server is configured to:
    receive, from the label provider, the created label;
    generate a machine-readable identifier for the label;
    store, in a data storage device, the created label and an association between the created label and the machine-readable identifier;
    receive, from an induction communication device, the machine-readable identifier for the label and location information for the induction communication device;
    retrieve the created label from the data storage device based at least in part on the machine-readable identifier;
    determine that the location information for the induction communication device is within a threshold distance of the sender address; and
    cause, via the induction communication device, generation of a physical label based at least in part on the created label retrieved from the data storage device, wherein the generation of the physical label is deferred for a period of time subsequent to the generation of the machine-readable identifier and wherein the physical label is generated in response to determining that the location information is within the threshold distance of the sender address.

2. The system of claim 1, wherein the distribution server is further configured to:
  receive, via the induction communication device, a confirmation that the physical label has been created; and
  store, in the data storage device, an indicator in association with the machine-readable identifier, wherein the indicator indicates that the physical label has been created.

3. The system of claim 2, wherein the distribution server is further configured to:
  receive, from another communication device, the machine-readable identifier for the label;
  determine, based on the indicator and the machine-readable identifier, that the physical label has been created; and
  transmit a message to the another communication device indicating that the physical label has been created.

4. The system of claim 1, wherein the distribution server is further configured to:
  receive, from a scanning device, scanned information from the physical label;
  confirm that the scanned information corresponds to the item; and
  route the item to an item processing equipment for a distribution network based at least in part on the scanned information.

5. The system of claim 4, wherein the physical label includes an identifier indicating that the physical label was generated by the distribution server based on a request from the label provider, and wherein the item processing equipment includes a postage canceler, and wherein the distribution server is configured to route the item to bypass the postage canceler in response to receiving the confirmation.

6. The system of claim 1, further comprising an induction receptacle for storing an item, wherein the induction receptacle includes:
  a locking means for securing the induction receptacle; and
  a scanning device for detecting information from the physical label; and wherein the distribution server is further configured to:
  receive, from the scanning device, scanned information from the physical label;
  retrieve a disposition status for the item from the data storage device based at least in part on the scanned information, wherein the disposition status indicates whether the item has been inducted into the distribution network;
  determine that the item has not been inducted to the distribution network based at least in part on the disposition status; and
  transmit a message to the locking means, wherein the message causes the locking means to permit access to the induction receptacle.

7. The system of claim 1, further comprising a labeling kiosk including an input interface for receiving machine readable identifiers for labels, wherein receiving the machine-readable identifier comprises receiving the machine-readable identifier from the labeling kiosk, and wherein the induction communication device comprises the labeling kiosk, and wherein the input interface comprises at least one of: (a) a scanning device; or (b) a graphical user interface.

8. The system of claim 1, wherein the created label comprises a data file containing information for generating the physical label.

9. The system of claim 1, wherein the created label comprises an image of the label.

10. The system of claim 1, wherein receiving the machine-readable identifier comprises receiving the machine readable identifier from portable, handheld scanning device associated with a distribution resource of the distribution network.

11. The system of claim 1, wherein the distribution server is further configured to transmit, to the sender communication device, the machine-readable identifier for the label.

12. The system of claim 1, wherein the distribution server is further configured to transmit, to the label provider, the machine-readable identifier for the label.

13. A system for labeled induction of an item into a distribution network, the system comprising:
  one or more processing devices; and
  a computer-readable storage medium storing machine readable instructions that, when executed by the one or more processing devices, cause the system to at least:
    receive, from a label provider, information for creating a label for distributing an item via a distribution network;
    receive a sender address identifying a location from which the item is being distributed,
    receive, from the second communication device, location information for the second communication device;
    create a label using the information for creating the label;
    generate a machine-readable identifier for the label;
    store, in a data storage device, the created label and an association between the created label and the machine-readable identifier;
    transmit, to a first communication device, the machine-readable identifier for the label;
    receive, from a second communication device, the machine-readable identifier for the label;
    retrieve the created label from the data storage device based at least in part on the machine-readable identifier;
    determine that the location information for the second communication device is within a threshold distance of the sender address; and
    in response to determining that the location information is within the threshold distance of the sender address, cause, via the second communication device, generation of a physical label based at least in part on the created label.

14. The system of claim 13, wherein the machine-readable instructions, when executed by the one or more processing devices, further cause the system to at least:
  receive, via the second communication device, a confirmation that the physical label has been generated; and
  store, in the data storage device, an indicator in association with the machine-readable identifier, wherein the indicator indicates that the physical label has been generated.

15. The system of claim 13, wherein the machine-readable instructions, when executed by the one or more processing devices, further cause the system to at least:
  receive, from another communication device, the machine-readable identifier for the label;
  retrieve, from the data storage device, a disposition status for the item associated with the label based at least in part on the machine-readable identifier;
  determine that the disposition status corresponds to an unauthorized status indicating that the label is no longer authorized for inducting the item to the distribution network; and
  transmit a message to the another communication device indicating that the label is unauthorized.

16. The system of claim 13, wherein the physical label includes an identifier indicating that the physical label was generated based on a request from the label provider, and wherein the distribution network includes a postage canceler, and wherein the machine-readable instructions, when executed by the one or more processing devices, further cause the system to at least route the item to bypass the postage canceler based at least in part on a disposition status for the item.

17. The system of claim 13, further comprising an induction receptacle for storing an item, wherein the induction receptacle includes:
  a locking means for securing the induction receptacle; and
  a scanning device for detecting information from the physical label; and
  wherein the machine-readable instructions, when executed by the one or more processing devices, further cause the system to at least:
    receive, from the scanning device, scanned information from the physical label;
    retrieve a disposition status for the item from the data storage device based at least in part on the scanned information, wherein the disposition status indicates whether the item has been inducted into the distribution network;
    determine that the item has not been inducted to the distribution network based at least in part on the disposition status; and
    transmit a message to the locking means, wherein the message causes the locking means to permit access to the induction receptacle.

18. The system of claim 17, wherein the induction receptacle further includes measurement means configured to collect measurement information a physical characteristic of the item; and wherein the information for creating the label includes a specified value for the physical characteristic; and wherein the machine-readable instructions, when executed by the one or more processing devices, further cause the system to at least:

store, in the data storage device, the specified value in association with the machine-readable identifier;

retrieve, from the data storage device, the specified value for the label based at least in part on the machine-readable identifier; and determine that the measurement information corresponds to the specified value for the physical characteristic, wherein the message is transmitted after determining that the measurement information corresponds to the specified value.

\* \* \* \* \*